(12) United States Patent
Nagahama

(10) Patent No.: US 12,107,449 B2
(45) Date of Patent: Oct. 1, 2024

(54) ELECTRICAL-DEVICE SYSTEM AND DETACHABLE DC POWER SOURCE

(71) Applicant: MAKITA CORPORATION, Anjo (JP)

(72) Inventor: Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 485 days.

(21) Appl. No.: 17/522,954

(22) Filed: Nov. 10, 2021

(65) Prior Publication Data

US 2022/0181894 A1 Jun. 9, 2022

(30) Foreign Application Priority Data

Dec. 7, 2020 (JP) ................. 2020-202944

(51) Int. Cl.
*H02J 7/00* (2006.01)
*B25F 5/02* (2006.01)
*H01M 50/213* (2021.01)
*H01M 50/244* (2021.01)
*H01M 50/247* (2021.01)
*H01M 50/296* (2021.01)
(Continued)

(52) U.S. Cl.
CPC .............. *H02J 7/0045* (2013.01); *B25F 5/02* (2013.01); *H01M 50/213* (2021.01); *H01M 50/244* (2021.01); *H01M 50/247* (2021.01); *H01M 50/296* (2021.01); *H01M 50/543* (2021.01); *H02J 7/0013* (2013.01); *H01M 50/298* (2021.01); *H01M 2220/30* (2013.01)

(58) Field of Classification Search
CPC .... H02J 7/0045; H02J 7/0013; H01M 50/213; H01M 50/244; H01M 50/247; H01M 50/298; H01M 50/396; H01M 50/543; H01M 2220/30; B25F 5/02
USPC .................................................. 320/112–115
See application file for complete search history.

(56) References Cited

U.S. PATENT DOCUMENTS

| 2006/0091858 | A1 | 5/2006 | Johnson et al. | |
| 2012/0048587 | A1* | 3/2012 | Umemura | B25F 5/02 173/217 |
| 2016/0241065 | A1 | 8/2016 | Kondo et al. | |

FOREIGN PATENT DOCUMENTS

| JP | 2007144813 A | 6/2007 |
| WO | 2020066905 A1 | 4/2020 |

* cited by examiner

*Primary Examiner* — Zixuan Zhou
(74) *Attorney, Agent, or Firm* — J-TEK LAW PLLC; Jeffrey D. Tekanic; Scott T. Wakeman

(57) ABSTRACT

A detachable DC power source includes: a reference surface extending in front-rear and left-right directions; support walls protruding upward from opposite ends of the reference surface and extending in the front-rear direction; battery-side rails protruding outward in the left-right direction from the upper ends of the pair of support walls and extending in the front-rear direction; and a first battery-side distinguishing region disposed between the support walls in the left-right direction and at a connection location between the reference surface and one of the support walls. A first battery-side distinguishing member is provided in the first battery-side distinguishing region and is directly connected to the one the support walls and to the reference surface. The detachable DC power source may be used to power an electrical device having a first device distinguishing part capable of receiving the first battery distinguishing member.

20 Claims, 23 Drawing Sheets

(51) Int. Cl.
*H01M 50/543* (2021.01)
*H01M 50/298* (2021.01)

ELECTRICAL-DEVICE SYSTEM AND DETACHABLE DC POWER SOURCE

CROSS-REFERENCE TO RELATED APPLICATION

This application claims priority to Japanese patent application no. 2020-202944 filed on Dec. 7, 2020, the contents of which are fully incorporated herein by reference.

TECHNICAL FIELD

Techniques disclosed in the present specification relate to an electrical-device system and to a detachable DC power source or battery-pack-type device (e.g., a battery pack) that may be used with the electrical-device system.

BACKGROUND ART

WO 2020/066905 discloses an electrical-device system that comprises a first electrical device (power tool), a second electrical device (power tool), a first detachable DC power source or battery-pack-type device (battery pack), and a second detachable DC power source or battery-pack-type device (battery pack). The first battery-pack-type device and the second battery-pack-type device each comprise: a reference surface (first lower surface) extending in a front-rear direction and a left-right direction; a pair of support walls (first rail sections) protruding upward from the two (opposite) ends of the reference surface and extending in the front-rear direction; a pair of battery-side rails (first rail sections) protruding outward in the left-right direction from upper ends of the pair of support walls and extending in the front-rear direction; and a battery-side distinguishing region disposed inward of (between) the pair of support walls in the left-right direction. A battery-side space is ensured (provided) in the battery-side distinguishing region of the first battery-pack-type device. A battery-side distinguishing member (protrusion), which is connected to only the reference surface, is provided (disposed) in the battery-side distinguishing region of the second battery-pack-type device. The first electrical device and the second electrical device each comprise: a pair of device-side rails, which respectively engage, in a slidable manner in the front-rear direction, with the pair of battery-side rails; and a device-side distinguishing part disposed at a location corresponding to the battery-side distinguishing region. The device-side distinguishing part of the first electrical device has a shape that is incapable of receiving the battery-side distinguishing member, e.g., the battery-side distinguishing member (protrusion) cannot be inserted into and/or past the device-side distinguishing part (e.g., a slot, a gap) of the first electrical device. The device-side distinguishing part of the second electrical device has a shape that is capable of receiving the battery-side distinguishing member; i.e. the battery-side distinguishing member can be inserted into and/or past the device-side distinguishing part of the second electrical device. The first battery-pack-type device (battery pack) is mountable on both the first electrical device and the second electrical device. On the other hand, the second battery-pack-type device is non-mountable (not mountable) on the first electrical device but is mountable on the second electrical device.

SUMMARY OF THE INVENTION

In a detachable DC power source or battery-pack-type device such as a battery pack, stress tends to concentrate at connection locations between the support walls, which respectively support the battery-side rails, and the reference surface, and therefore breakage tends to occur at the connection locations between each of the support walls and the reference surface. The present specification discloses techniques for using one or more battery-side distinguishing members, which is (are) provided on the battery-pack-type device, for distinguishing (determining, permitting) whether an electrical device is mountable on a particular electrical device while also reinforcing one or both the connection locations on the battery-pack-type device, thereby reducing the likelihood of breakage of the battery-pack-type device.

In one aspect of the present disclosure, an electrical-device system may comprise a first electrical device (e.g., a power tool, an electrically-powered device or a charger), a second electrical device (e.g., a power tool, an electrically-powered device or a charger), a first detachable DC power source or battery-pack-type device or first detachable DC power source (e.g., a battery pack or adapter), and a second detachable DC power source or battery-pack-type device or second detachable DC power source (e.g., a battery pack or adapter). The first battery-pack-type device and the second battery-pack-type device each may comprise: a reference surface extending in a front-rear direction and a left-right direction; a pair of support walls protruding upward from the two (opposite) ends of the reference surface and extending in the front-rear direction; a pair of battery-side rails protruding outward in the left-right direction from the upper ends of the pair of support walls and extending in the front-rear direction; and a first battery-side distinguishing region (first battery distinctive region) disposed inward of (between) the pair of support walls in the left-right direction and at a connection location between one support wall of the pair of support walls and the reference surface. A first battery-side space may be ensured (provided) in the first battery-side distinguishing region of the first battery-pack-type device. A first battery-side distinguishing member (first battery distinctive structure, e.g., a rib, shoulder or other type of protrusion), which is connected to the one support wall of the pair of support walls and is connected to the reference surface, may be provided in the first battery-side distinguishing region of the second battery-pack-type device. The first electrical device and the second electrical device each may comprise: a pair of device-side rails that respectively engage, in a slidable manner in the front-rear direction, with the battery-side rails; and a first device-side distinguishing part disposed at a location corresponding to the first battery-side distinguishing region. The first device-side distinguishing part of the first electrical device may have a shape that is incapable of receiving the first battery-side distinguishing member; e.g., the first battery-side distinguishing member cannot be inserted into and/or past the first device-side distinguishing part. The first device-side distinguishing part of the second electrical device may have a shape that is capable of receiving the first battery-side distinguishing member; e.g., the first battery-side distinguishing member can be inserted into and/or past the first device-side distinguishing part. The first battery-pack-type device may be mountable on both the first electrical device and the second electrical device. On the other hand, the second battery-pack-type device may be non-mountable (not mountable) on the first electrical device but may be mountable on the second electrical device.

In the above-described electrical-device system, because the first battery-side distinguishing member is provided on the second battery-pack-type device, the second battery-pack-type device is prohibited (blocked) from being mistakenly mounted on the first electrical device (e.g., because the second battery-pack-type device has a rated voltage and/or current that exceeds the specifications of the first electrical device). In addition, because the first battery-side distinguishing member is connected to both one support wall of the pair of support walls and to the reference surface, the strength of the connection location between the one support wall of the pair of support walls and the reference surface can be increased by the first battery-side distinguishing member. Thus, according to the above-mentioned electrical-device system, because the first battery-side distinguishing member is provided on (and reinforces) the second battery-pack-type device in this manner, the likelihood of breakage of the second battery-pack-type device at the connection location can be reduced.

In another aspect of the present disclosure, a battery-pack-type device or detachable DC power source (e.g., a battery pack or adapter) may comprise: a reference surface extending in a front-rear direction and a left-right direction; a pair of support walls protruding upward from the two (opposite) ends of the reference surface and extending in the front-rear direction; a pair of battery-side rails protruding outward in the left-right direction from the upper ends of the pair of support walls and extending in the front-rear direction; and a first battery-side distinguishing region (first battery distinctive region) disposed inward of (between) the pair of support walls in the left-right direction and at a connection location between one support wall of the pair of support walls and the reference surface. A first battery-side distinguishing member (first battery distinctive structure, e.g., a rib, shoulder or other type of protrusion), which is connected to the one support wall of the pair of support walls and is connected to the reference surface, may be provided in the first battery-side distinguishing region.

In the above-described battery-pack-type device or detachable DC power source, owing to the first battery-side distinguishing member, the battery-pack-type device is prohibited (blocked) from being mistakenly mounted on an electrical device on which the battery-pack-type device is intended to be non-mountable (e.g., because the battery-pack-type device has a rated voltage and/or current that exceeds the specifications of the electrical device). Because the first battery-side distinguishing member is connected to both one support wall of the pair of support walls and the reference surface, the strength of the connection location between the one support wall of the pair of support walls and the reference surface can be increased by the first battery-side distinguishing member; i.e. owing to the design of the connection, the first battery-side distinguishing member also serves as a connection location reinforcing structure. Thus, according to the above-mentioned configuration, because the first battery-side distinguishing member is provided/arranged in this manner, the likelihood of breakage of the battery-pack-type device at the connection location can be reduced. As used herein, the term "battery-pack-type device" and "detachable DC power source" should be understood as covering (including) not only a battery pack (battery cartridge), but also other types of devices that are mountable on a battery-pack mounting part of the electrical device to supply power (current) to the electrical device, such as, for example, an adapter or the like that is electrically connectable to a battery pack (e.g., a conventional battery pack) or another source of electrical power. In case of an adapter, it may optionally include an AC/DC converter for connecting the electrical devices, which operate with DC power, to an AC power source.

DETAILED DESCRIPTION OF EMBODIMENTS OF THE INVENTION

Figure 1:
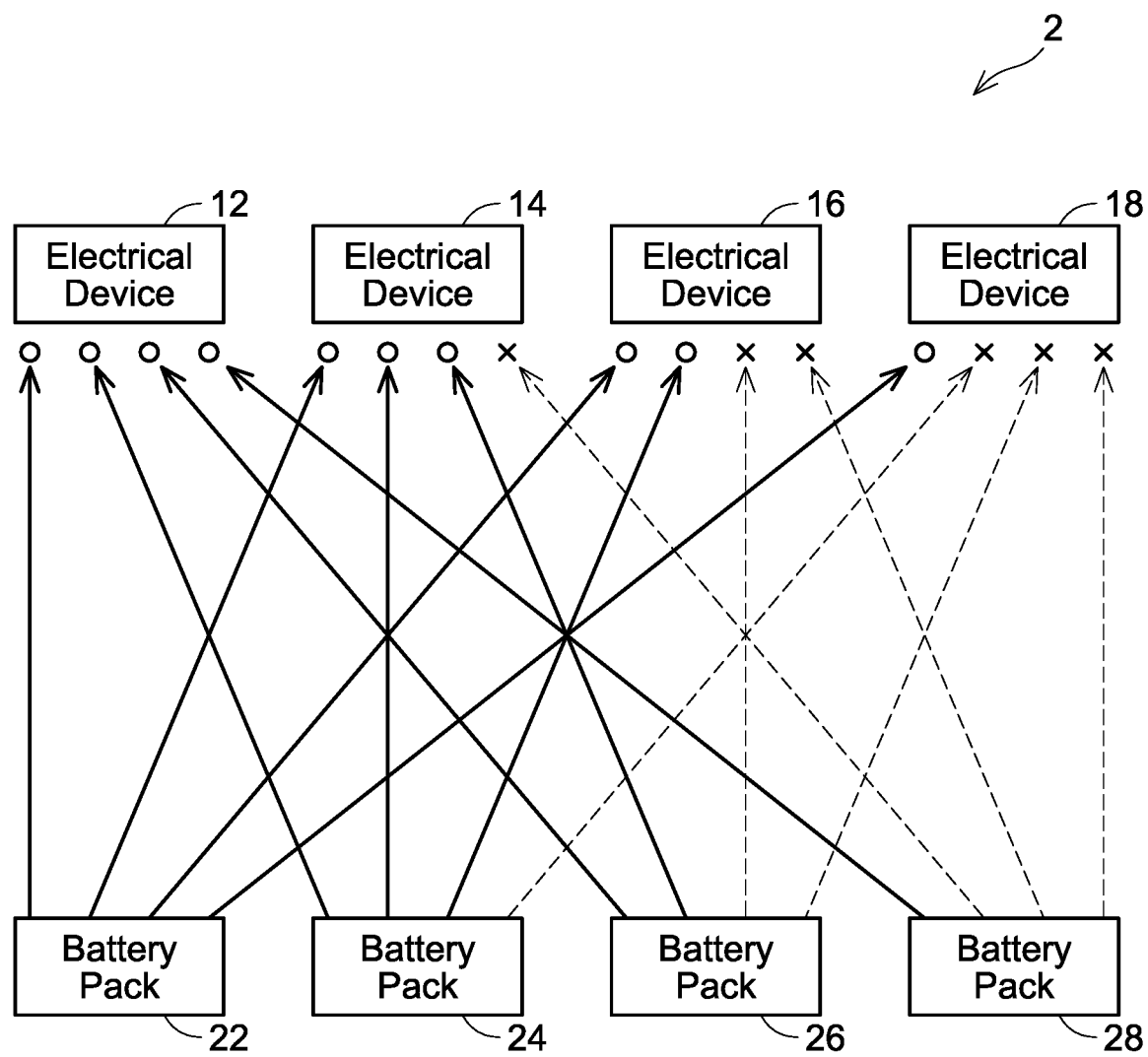
FIG. 1 schematically shows the configuration of an electrical-device system 2 according to an exemplary embodiment of the present teachings.

Representative, non-limiting concrete examples of the present invention are explained in detail below, with reference to the drawings. This detailed explanation is intended merely to illustrate to a person skilled in the art for practicing preferred aspects of the present teachings and is not intended to limit the scope of the present invention. In addition, each of the additional features and the teachings disclosed herein can be used separately from or together with other features and teachings to provide further improved electrical-device systems and battery-pack-type devices.

In addition, the combinations of features and processes disclosed in the detailed explanation below are not essential to carry out the present invention in the broadest sense and are recited only to particularly explain representative concrete examples of the present teachings. Furthermore, to provide additional and useful embodiments of the present invention, the various features of the representative concrete examples below and the various features of the claims do not necessarily have to be combined as indicated in the concrete examples recited herein or as indicated in the sequence enumerated herein.

All features recited in the present specification and/or in the claims are intended, separately from the configuration of features disclosed in the exemplary embodiments and/or the claims, to be disclosed individually and mutually independently as limitations relative to the specific matters disclosed in the disclosure and claims of the original patent application. Furthermore, description related to all numerical ranges, groups, and collections (groups of entities) are intended to disclose intermediate configurations thereof as limitations relative to specific matters recited in the disclosure and the claims of the original patent application. In addition, all value ranges or indications of groups of entities are intended to disclose every possible intermediate value or intermediate entity for the purpose of original written disclosure, as well as for the purpose of restricting the claimed subject matter.

In one or more embodiments, an electrical-device system may comprise a first electrical device (e.g., a power tool, an electrically-powered device or a charger), a second electrical device (e.g., a power tool, an electrically-powered device or a charger), a first battery-pack-type device or detachable DC power source (e.g., a battery pack or adapter having a power source attached thereto), and a second battery-pack-type device or detachable DC power source (e.g., a battery pack or adapter having a power source attached thereto). The first battery-pack-type device and the second battery-pack-type device each may comprise: a reference surface extending in a front-rear direction and a left-right direction; a pair of support walls protruding upward from the two (opposite) ends of the reference surface and extending in the front-rear direction; a pair of battery-side rails protruding outward in the left-right direction from the upper ends of the pair of support walls and extending in the front-rear direction; and a first battery-side distinguishing region disposed inward of the pair of support walls in the left-right direction and at a connection location between one support wall of the pair of support walls and the reference surface. A first battery-side space may be ensured (provided) in the first battery-side distinguishing region of the first battery-pack-type device. A first battery-side distinguishing member, which is connected to the one support wall of the pair of support walls and is connected to the reference surface, may be provided in the first battery-side distinguishing region of the second battery-pack-type device. The first electrical device and the second electrical device each may comprise: a pair of device-side rails that engage, in a slidable manner in the front-rear direction, with the pair of battery-side rails; and a first device-side distinguishing part disposed at a location corresponding to the first battery-side distinguishing region. The first device-side distinguishing part of the first electrical device may have a shape that is incapable of receiving the first battery-side distinguishing member, e.g., the first battery-side distinguishing member cannot be inserted into the first device-side distinguishing part. The first device-side distinguishing part of the second electrical device may have a shape that is capable of receiving the first battery-side distinguishing member; e.g., the first battery-side distinguishing member can be inserted and/or past into the first device-side distinguishing part. The first battery-pack-type device may be (configured to be) mountable on the first electrical device and may be (configured to be) mountable on the second electrical device. The second battery-pack-type device may be (configured to be) non-mountable on the first electrical device and may be (configured to be) mountable on the second electrical device.

In the above-described electrical-device system, because the first battery-side distinguishing member is provided on the second battery-pack-type device, the second battery-pack-type device is prohibited (blocked) from being mistakenly mounted on the first electrical device. In addition, because the first battery-side distinguishing member is connected to one support wall of the pair of support walls and is connected to the reference surface, the strength of the connection location between the one support wall of the pair of support walls and the reference surface can be increased by the first battery-side distinguishing member, which also serves as a connection location reinforcing structure. Thus, according to the above-mentioned electrical-device system, because the first battery-side distinguishing member is provided on the second battery-pack-type device, the likelihood of breakage of the second battery-pack-type device at the connection location (where the first battery-side distinguishing member is provided/arranged) can be reduced.

In one or more embodiments, the weight of the second battery-pack-type device may be greater than the weight of the first battery-pack-type device. For example, the weight of the second battery-pack-type device may be at least 10%, preferably at least 20% or 30%, greater than the weight of the first battery-pack-type device.

In an embodiment in which the weight of the second battery-pack-type device is greater than the weight of the first battery-pack-type device, a larger force tends to be applied to the connection locations between the pair of support walls and the reference surface of the second battery-pack-type device than a corresponding force applied to the connection locations between the pair of support walls and the reference surface of the first battery-pack-type device. However, because the first battery-side distinguishing member is provided on the second battery-pack-type device in such an embodiment and serves as a reinforcing structure for one of the connection locations, the strength of the second battery-pack-type device at that connection location can be increased as compared to the strength of the first battery-pack-type device, thereby reducing the likelihood of breakage at the connection location of the second battery-pack-type device that has been reinforced.

In one or more embodiments, the first battery-pack-type device and the second battery-pack-type device each may comprise battery cells. The number of the battery cells of the second battery-pack-type device may be greater than the number of the battery cells of the first battery-pack-type device. For example, the number of the battery cells of the second battery-pack-type device may be at least 10%, preferably at least 20% or 30%, greater than the number of the battery cells of the first battery-pack-type device.

In an embodiment in which the first battery-pack-type device and the second battery-pack-type device each comprise the battery cells, generally speaking, the greater the number of the battery cells, the greater the total weight of the battery cells (i.e. the greater the total weight of the battery-pack-type device) becomes. Consequently, a larger force tends to be applied to the connection locations between the pair of support walls and the reference surface of the second battery-pack-type than a corresponding force applied to the connection locations between the pair of support walls and the reference surface of the first battery-pack-type device. However, because the first battery-side distinguishing member is provided on the second battery-pack-type device in such an embodiment and serves as a reinforcing structure for that connection location, the strength of the second battery-pack-type device at that connection location can be increased as compared to the strength of the first battery-pack-type device, thereby reducing the likelihood of breakage at the connection location of the second battery-pack-type device that has been reinforced.

In one or more embodiments, the first battery-pack-type device and the second battery-pack-type device each may comprise battery cells. The size (e.g., volume) of the battery cells of the second battery-pack-type device may be larger than the size (e.g., volume) of the battery cells of the first battery-pack-type device. For example, the size (e.g., volume) of the battery cells of the second battery-pack-type device may be at least 10%, preferably at least 20% or 30%, larger than the size (e.g., volume) of the battery cells of the first battery-pack-type device.

In an embodiment in which the first battery-pack-type device and the second battery-pack-type device each comprise the battery cells, generally speaking, the larger the size of the battery cells, the greater the total weight of the battery cells (i.e. the greater the total weight of the battery-pack-type device) becomes. Consequently, a larger force tends to be applied to the connection locations between the pair of support walls and the reference surface of the second battery-pack-type device than a corresponding force applied to the connection locations between the pair of support walls and the reference surface of the first battery-pack-type device. However, because the first battery-side distinguishing member is provided on the second battery-pack-type device in such an embodiment and serves as a reinforcing structure for that connection location, the strength of the second battery-pack-type device at that connection location can be increased as compared to the strength of the first battery-pack-type device, thereby reducing the likelihood of breakage at the connection location of the second battery-pack-type device that has been reinforced.

In one or more embodiments, the first battery-pack-type device and the second battery-pack-type device each may comprise battery cells. The rated capacity of the second battery-pack-type device may be higher than the rated capacity of the first battery-pack-type device. For example, the rated capacity of the second battery-pack-type device may be at least 10%, preferably at least 20% or 30%, higher than the rated capacity of the first battery-pack-type device.

In an embodiment in which the first battery-pack-type device and the second battery-pack-type device each comprise the battery cells, generally speaking, the higher the rated capacity of the battery cells, the greater the total weight of the battery cells (i.e. the total weight of the battery-pack-type device) becomes. Consequently, a larger force tends to be applied to the connection locations between the pair of support walls and the reference surface of the second battery-pack-type device than a corresponding force applied to the connection locations between the pair of support walls and the reference surface of the first battery-pack-type device. However, because the first battery-side distinguishing member is provided on the second battery-pack-type device in such an embodiment and serves as a reinforcing structure for that connection location, the strength of the second battery-pack-type device at that connection location can be increased as compared to the strength of the first battery-pack-type device, thereby reducing the likelihood of breakage at the connection location of the second battery-pack-type device that has been reinforced.

In one or more embodiments, the first battery-pack-type device and the second battery-pack-type device each may comprise battery cells. The rated voltage of the second battery-pack-type device may be higher than the rated voltage of the first battery-pack-type device. For example, the rated voltage of the second battery-pack-type device may be at least 10%, preferably at least 20% or 30%, higher than the rated voltage of the first battery-pack-type device.

In an embodiment in which the first battery-pack-type device and the second battery-pack-type device each comprise the battery cells, generally speaking, the higher the rated voltage of the battery cells, the greater the total weight of the battery cells (i.e. the total weight of the battery-pack-type device) becomes. Consequently, a larger force tends to be applied to the connection locations between the pair of support walls and the reference surface of the second battery-pack-type device than a corresponding force applied to the connection locations between the pair of support walls and the reference surface of the first battery-pack-type device. However, because the first battery-side distinguishing member is provided on the second battery-pack-type device in such an embodiment and serves as a reinforcing structure for that connection location, the strength of the second battery-pack-type device at that connection location can be increased as compared to than the strength of the first battery-pack-type device, thereby reducing the likelihood of breakage at the connection location of the second battery-pack-type device that has been reinforced.

In one or more embodiments, the electrical-device system may further comprise a third electrical device (e.g., a power tool, an electrically-powered device or a charger) and a third battery-pack-type device or detachable DC power source (e.g., a battery pack or adapter having a power source attached thereto). The first battery-pack-type device and the second battery-pack-type device each may further comprise a second battery-side distinguishing region (second battery distinctive region) disposed inward of the pair of support walls in the left-right direction and at a connection location between the other support wall of the pair of support walls and the reference surface. A second battery-side space may be ensured (provided) in each of the second battery-side distinguishing region of the first battery-pack-type device and the second battery-side distinguishing region of the second battery-pack-type device. The third battery-pack-type device may comprise: the reference surface; the pair of support walls; the pair of battery-side rails; the first battery-side distinguishing region; and the second battery-side distinguishing region. The first battery-side distinguishing member may be provided in the first battery-side distinguishing region of the third battery-pack-type device. A second battery-side distinguishing member (second battery distinctive structure, e.g., a rib, a shoulder or other type of protrusion), which is connected to the other support wall of the pair of support walls and is connected to the reference surface, may be provided in the second battery-side distinguishing region of the third battery-pack-type device. The first electrical device and the second electrical device each may further comprise a second device-side distinguishing part (second device distinctive part) disposed at a location corresponding to the second battery-side distinguishing region. The second device-side distinguishing part of the first electrical device and the second device-side distinguishing part of the second electrical device each may have a shape that is incapable of receiving the second battery-side distinguishing member, e.g., the second battery-side distinguishing member cannot be inserted into and/or past the second device-side distinguishing part of the first electrical device and the second device-side distinguishing part of the second electrical device. The third electrical device may comprise: the pair of device-side rails; the first device-side distinguishing part; and the second device-side distinguishing part. The first device-side distinguishing part of the third electrical device may have a shape that is capable of receiving the first battery-side distinguishing member; e.g., the first battery-side distinguishing member can be inserted into and/or past the first device-side distinguishing part of the third electrical device. The second device-side distinguishing part of the third electrical device may have a shape that is capable of receiving the second battery-side distinguishing member; e.g., the second battery-side distinguishing member can be inserted into and/or past the second device-side distinguishing part of the third electrical device. The first battery-pack-type device may be (configured to be) mountable on the third electrical device and the second battery-pack-type device also may be (configured to be) mountable on the third electrical device. On the other hand, the third battery-pack-type device may be (configured to be) non-mountable on both the first electrical device and the second electrical device, but mountable on the third electrical device.

In the above-described electrical-device system, because the first battery-side distinguishing member and the second battery-side distinguishing member are provided on the third battery-pack-type device, the third battery-pack-type device is prohibited (blocked) from being mistakenly mounted on the first electrical device and the second electrical device. In addition, because the first battery-side distinguishing member is connected to one support wall of the pair of support walls and is connected to the reference surface, the strength of the connection location between the one support wall of the pair of support walls and the reference surface can be increased by the first battery-side distinguishing member. Moreover, because the second battery-side distinguishing member is connected to the other support wall of the pair of support walls and is connected to the reference surface, the strength of the (other, second) connection location between the other support wall of the pair of support walls and the reference surface can be increased by the second battery-side distinguishing member. Thus, according to the above-mentioned electrical-device system, because the first battery-side distinguishing member and the second battery-side distinguishing member are provided/arranged on the third battery-pack-type device in this manner, the likelihood of breakage of the third battery-pack-type device at the two connection locations can be reduced.

In one or more embodiments, the electrical-device system may further comprise a third electrical device (e.g., a power tool, an electrically-powered device or a charger) and a third battery-pack-type device or detachable DC power source (e.g., a battery pack or adapter having a power source attached thereto). The third battery-pack-type device may comprise: the reference surface; the pair of support walls; the pair of battery-side rails; and the first battery-side distinguishing region. A third battery-side distinguishing member (third battery distinctive structure, such as a rib, shoulder or other type of protrusion), which is connected to the one support wall of the pair of support walls and is connected to the reference surface and whose size is larger than that of the first battery-side distinguishing member, may be provided in the first battery-side distinguishing region of the third battery-pack-type device. The first device-side distinguishing part of the first electrical device and the first device-side distinguishing part of the second electrical device each may have a shape that is incapable of receiving the third battery-side distinguishing member, e.g., the third battery-side distinguishing member cannot be inserted into and/or past the first device-side distinguishing parts of the first and second electrical devices. The third electrical device may comprise: the pair of device-side rails; and the first device-side distinguishing part. The first device-side distinguishing part of the third electrical device may have a shape that is capable of receiving the first battery-side distinguishing member and the third battery-side distinguishing member; e.g., the first and third battery-side distinguishing members can be inserted into and/or past the first device-side distinguishing part of the third electrical device. The first battery-pack-type device may be (configured to be) mountable on the third electrical device and the second battery-pack-type device also may be (configured to be) mountable on the third electrical device. On the other hand, the third battery-pack-type device may be (configured to be) non-mountable on both the first electrical device and the second electrical device, but mountable on the third electrical device.

In the above-described electrical-device system, because the third battery-side distinguishing member is provided on the third battery-pack-type device, the third battery-pack-type device is prohibited (blocked) from being mistakenly mounted on the first electrical device and the second electrical device. In addition, because the third battery-side distinguishing member is connected to one support wall of the pair of support walls and is connected to the reference surface, the strength of the connection location between the one support wall of the pair of support walls and the reference surface can be increased by the third battery-side distinguishing member. Thus, according to the above-mentioned electrical-device system, because the third battery-side distinguishing member is provided on the third battery-pack-type device in this manner, the likelihood of breakage of the third battery-pack-type device at that connection location can be reduced.

In one or more embodiments, the first battery-pack-type device, the second battery-pack-type device, and the third battery-pack-type device each may further comprise a second battery-side distinguishing region (second battery distinctive region) disposed inward of (between) the pair of support walls in the left-right direction and at a (another, second) connection location between the other support wall of the pair of support walls and the reference surface. A second battery-side space may be ensured (provided) in the second battery-side distinguishing region of the first battery-pack-type device. A second battery-side distinguishing member (second battery distinctive structure, such as a rib, shoulder or other type of protrusion), which is connected to the other support wall of the pair of support walls and is connected to the reference surface, may be provided in the second battery-side distinguishing region of the second battery-pack-type device. A fourth battery-side distinguishing member (fourth battery distinctive structure, such as a rib, shoulder or other type of protrusion), which is connected to the other support wall of the pair of support walls and is connected to the reference surface and whose size is larger than that of the second battery-side distinguishing member, may be provided in the second battery-side distinguishing region of the third battery-pack-type device. The first electrical device, the second electrical device, and the third electrical device each may further comprise a second device-side distinguishing part (second device distinctive part) disposed at a location corresponding to the second battery-side distinguishing region. The second device-side distinguishing part of the first electrical device may have a shape that is incapable of receiving the second battery-side distinguishing member and the fourth battery-side distinguishing member, e.g., the second battery-side distinguishing member and the fourth battery-side distinguishing member cannot be inserted into and/or past the second device-side distinguishing part of the first electrical device. The second device-side distinguishing part of the second electrical device may have a shape that is capable of receiving the second battery-side distinguishing member and incapable of receiving the fourth battery-side distinguishing member; e.g., the second battery-side distinguishing member can be inserted into and/or past the second device-side distinguishing part of the second electrical device but the fourth battery-side distinguishing member cannot be inserted into and/or past the second device-side distinguishing part of the second electrical device. The second device-side distinguishing part of the third electrical device may have a shape that is capable of receiving the second battery-side distinguishing member and the fourth battery-side distinguishing member; e.g., the second battery-side distinguishing member and the fourth battery-side distinguishing member can be inserted into and/or past the second device-side distinguishing part of the third electrical device.

Because the second battery-side distinguishing member and the fourth battery-side distinguishing member are connected to the other support wall of the pair of support walls and are connected to the reference surface, the strength of the (other, second) connection location between the other support wall of the pair of support walls and the reference surface can be increased by the second battery-side distinguishing member or by the fourth battery-side distinguishing member. Thus, according to the above-mentioned electrical-device system, because the second battery-side distinguishing member is provided/arranged on the second battery-pack-type device in this manner, the likelihood of breakage of the second battery-pack-type device at that (other, second) connection location can be reduced. In addition, because the fourth battery-side distinguishing member is provided on the third battery-pack-type device in this manner, the likelihood of breakage of the third battery-pack-type device at that (other, second) connection location can be reduced.

In one or more embodiments, the weight of the second battery-pack-type device may be greater than the weight of the first battery-pack-type device. In addition or in the alternative, the weight of the third battery-pack-type device may be greater than the weight of the second battery-pack-type device. For example, the weight of the second battery-pack-type device may be at least 10%, preferably at least 20% or 30%, greater than the weight of the first battery-pack-type device. In addition or in the alternative, the weight of the third battery-pack-type device may be at least 10%, preferably at least 20% or 30%, greater than the weight of the second battery-pack-type device.

In an embodiment in which the weight of the second battery-pack-type device is greater than the weight of the first battery-pack-type device, generally speaking, a larger force tends to be applied to the connection locations between the pair of support walls and the reference surface of the second battery-pack-type device than a corresponding force applied to the connection locations between the pair of support walls and the reference surface of the first battery-pack-type device. In addition, in an embodiment in which the weight of the third battery-pack-type device is greater than the weight of the second battery-pack-type device, a larger force tends to be applied to the connection locations between the pair of support walls and the reference surface of the third battery-pack-type device than the force applied to the connection locations between the pair of support walls and the reference surface of the second battery-pack-type device. However, because the first battery-side distinguishing member is provided on the second battery-pack-type device in such an embodiment and serves as a reinforcing structure for that connection location, the strength of the second battery-pack-type device at that connection location thereof can be increased as compared to the strength of the first battery-pack-type device at the corresponding connection location thereof. In addition, because the first battery-side distinguishing member and the second battery-side distinguishing member are provided on the third battery-pack-type device in such an embodiment and respectively serve as reinforcing structures for the two connection locations, the strength of the third battery-pack-type device at the connection locations thereof can be increased as compared to the strength of the second battery-pack-type device at the corresponding connection location thereof, thereby reducing the likelihood of breakage at the two connection locations of the third battery-pack-type device. In addition or in the alternative, according to the above-mentioned configuration, because the third battery-side distinguishing member, whose size is larger than that of the first battery-side distinguishing member, is provided on the third battery-pack-type device in the above-describe manner, the strength of the third battery-pack-type device at that connection location thereof can be increased as compared to the strength of the second battery-pack-type device at the corresponding connection location thereof, thereby reducing the likelihood of breakage at the connection location(s) of the third battery-pack-type device that has (have) been reinforced.

In one or more embodiments, the first battery-pack-type device, the second battery-pack-type device, and the third battery-pack-type device each may comprise battery cells. The number of the battery cells of the second battery-pack-type device may be greater than the number of the battery cells of the first battery-pack-type device. The number of the battery cells of the third battery-pack-type device may be greater than the number of the battery cells of the second battery-pack-type device. For example, the number of the battery cells of the second battery-pack-type device may be at least 10%, preferably at least 20% or 30%, greater than the number of the battery cells of the first battery-pack-type device. In addition or in the alternative, the number of the battery cells of the third battery-pack-type device may be at least 10%, preferably at least 20% or 30%, greater than the number of the battery cells of the second battery-pack-type device.

In an embodiment in which the first battery-pack-type device, the second battery-pack-type device, and the third battery-pack-type device each comprise the battery cells, generally speaking, the greater the number of the battery cells, the greater the total weight of the battery pack becomes. Consequently, in the above-mentioned configuration, a larger force tends to be applied to the connection locations between the pair of support walls and the reference surface of the second battery-pack-type device than a corresponding force applied to the connection locations between the pair of support walls and the reference surface of the first battery-pack-type device, and a larger force tends to be applied to the connection locations between the pair of support walls and the reference surface of the third battery-pack-type device than the force applied to the connection locations between the pair of support walls and the reference surface of the second battery-pack-type device. According to the above-mentioned configuration, because the first battery-side distinguishing member is provided on the second battery-pack-type device, the strength of the second battery-pack-type device at that connection location thereof can be increased as compared to the strength of the first battery-pack-type device at the corresponding connection location thereof. In addition, according to the above-mentioned configuration, because the first battery-side distinguishing member and the second battery-side distinguishing member are provided on the third battery-pack-type device in the above-described manner, the strength of the third battery-pack-type device at the two connection locations thereof can be increased as compared to the strength of the second battery-pack-type device at the corresponding connection locations thereof. In addition or in the alternative, according to the above-mentioned configuration, because the third battery-side distinguishing member, whose size is larger than that of the first battery-side distinguishing member, is provided on the third battery-pack-type device, the strength of the third battery-pack-type device at that connection location thereof can be increased as compared to the strength of the second battery-pack-type device at the corresponding connection location thereof.

In one or more embodiments, the first battery-pack-type device, the second battery-pack-type device, and the third battery-pack-type device each may comprise battery cells. The rated capacity of the second battery-pack-type device may be higher than the rated capacity of the first battery-pack-type device. The rated capacity of the third battery-pack-type device may be higher than the rated capacity of the second battery-pack-type device. For example, the rated capacity of the second battery-pack-type device may be at least 10%, preferably at least 20% or 30%, higher than the rated capacity of the first battery-pack-type device. In addition or in the alternative, the rated capacity of the third battery-pack-type device may be at least 10%, preferably at least 20% or 30%, higher than the rated capacity of the second battery-pack-type device.

In an embodiment in which the first battery-pack-type device, the second battery-pack-type device, and the third battery-pack-type device each comprise the battery cells, generally speaking, the higher the rated capacity of the battery cells, the greater the total weight of the battery-pack-type device becomes. Consequently, in the above-mentioned configuration, a larger force tends to be applied to the connection locations between the pair of support walls and the reference surface of the second battery-pack-type device than a corresponding force applied to the connection locations between the pair of support walls and the reference surface of the first battery-pack-type device, and a larger force tends to be applied to the connection locations between the pair of support walls and the reference surface of the third battery-pack-type device than the force applied to the connection locations between the pair of support walls and the reference surface of the second battery-pack-type device. According to the above-mentioned configuration, because the first battery-side distinguishing member is provided/arranged on the second battery-pack-type device in the above-described manner, the strength of the second battery-pack-type device at that connection location thereof can be increased as compared to the strength of the first battery-pack-type device at the corresponding connection location thereof. In addition, according to the above-mentioned configuration, because the first battery-side distinguishing member and the second battery-side distinguishing member are provided/arranged on the third battery-pack-type device in the above-described manner, the strength of the third battery-pack-type device at the two connection locations thereof can be increased as compared to the strength of the second battery-pack-type device at the corresponding two connection locations thereof. In addition or in the alternative, according to the above-mentioned configuration, because the third battery-side distinguishing member, whose size is larger than that of the first battery-side distinguishing member, is provided/arranged on the third battery-pack-type device in the above-described manner, the strength of the third battery-pack-type device at that connection location thereof can be increased as compared to the strength of the second battery-pack-type device at the corresponding connection location thereof.

In one or more embodiments, the first battery-pack-type device, the second battery-pack-type device, and the third battery-pack-type device each may comprise battery cells. The rated voltage of the second battery-pack-type device may be higher than the rated voltage of the first battery-pack-type device. The rated voltage of the third battery-pack-type device may be higher than the rated voltage of the second battery-pack-type device. For example, the rated voltage of the second battery-pack-type device may be at least 10%, preferably at least 20% or 30%, higher than the rated voltage of the first battery-pack-type device. In addition or in the alternative, the rated voltage of the third battery-pack-type device may be at least 10%, preferably at least 20% or 30%, higher than the rated voltage of the second battery-pack-type device.

In an embodiment in which the first battery-pack-type device, the second battery-pack-type device, and the third battery-pack-type device each comprise the battery cells, generally speaking the higher the rated voltage of the battery cells, the greater the total weight of the battery-pack-type device becomes. Consequently, in the above-mentioned configuration, a larger force tends to be applied to the connection locations between the pair of support walls and the reference surface of the second battery-pack-type device than a corresponding force applied to the connection locations between the pair of support walls and the reference surface of the first battery-pack-type device, and a larger force tends to be applied to the connection locations between the pair of support walls and the reference surface of the third battery-pack-type device than the force applied to the connection locations between the pair of support walls and the reference surface of the second battery-pack-type device. According to the above-mentioned configuration, because the first battery-side distinguishing member is provided/arranged on the second battery-pack-type device in the above-described manner, the strength of the second battery-pack-type device at that connection location thereof can be increased as compared to the strength of the first battery-pack-type device at the corresponding connection location thereof. In addition, according to the above-mentioned configuration, because the first battery-side distinguishing member and the second battery-side distinguishing member are provided/arranged on the third battery-pack-type device in the above-described manner, the strength of the third battery-pack-type device at the two connection location thereof can be increased as compared to the strength of the second battery-pack-type device at the corresponding two connection location thereof. In addition or in the alternative, according to the above-mentioned configuration, because the third battery-side distinguishing member, whose size is larger than that of the first battery-side distinguishing member, is provided/arranged on the third battery-pack-type device in the above-described manner, the strength of the third battery-pack-type device at that connection location thereof can be increased as compared to the strength of the second battery-pack-type device at the corresponding connection location thereof.

In one or more embodiments, a battery-pack-type device may comprise: a reference surface extending in a front-rear direction and a left-right direction; a pair of support walls protruding upward from the two (opposite) ends of the reference surface and extending in the front-rear direction; a pair of battery-side rails protruding outward in the left-right direction from the upper ends of the pair of support walls and extending in the front-rear direction; and a first battery-side distinguishing region disposed inward of (between) the pair of support walls in the left-right direction and at a connection location between one support wall of the pair of support walls and the reference surface. A first battery-side distinguishing member (first battery distinctive structure, such as, e.g., a rib, shoulder or other type of protrusion), which is connected to the one support wall of the pair of support walls and is connected to the reference surface, may be provided in the first battery-side distinguishing region.

In the above-described battery-pack-type device, owing to the first battery-side distinguishing member, the battery-pack-type device is prohibited (blocked) from being mistakenly mounted on an electrical device on which it is unmountable (e.g., an electrical device that should not receive power from the battery-pack-type device, e.g., because the rated voltage and/or current of the battery-pack-type device is too high). Because the first battery-side distinguishing member is connected to one support wall of the pair of support walls and is connected to the reference surface in the above-described manner, the strength of that connection location between the one support wall of the pair of support walls and the reference surface can be increased by the first battery-side distinguishing member. Thus, according to the above-mentioned configuration, because the first battery-side distinguishing member is used in the above-describe manner, the likelihood of breakage of the battery-pack-type device at that connection location can be reduced.

In one or more embodiments, the weight of the battery-pack-type device may be 1.1 kg or more. More specifically, the weight of the battery-pack-type device may be 1.5 kg or more and, yet more specifically, the weight of the battery-pack-type device may be 2.0 kg or more.

The greater the weight of the battery-pack-type device, the greater is the force that tends to be applied to the connection locations between the pair of support walls and the reference surface. According to the above-mentioned configuration, the weight of the battery-pack-type device is large; accordingly, even in an embodiment in which a large force is applied to the connection locations between the pair of support walls and the reference surface, it is possible to reduce the likelihood of breakage of the (reinforced) connection location between one support wall of the pair of support walls and the reference surface.

In one or more embodiments, the battery-pack-type device may further comprise a second battery-side distinguishing region (second battery distinctive region) disposed inward of (between) the pair of support walls in the left-right direction and at the (other, second) connection location between another support wall of the pair of support walls and the reference surface. A second battery-side distinguishing member (second battery distinctive structure, such as a rib, shoulder or other type of protrusion), which is connected to the other support wall of the pair of support walls and is connected to the reference surface, may be provided in the second battery-side distinguishing region.

In the above-described battery-pack-type device, owing to the first battery-side distinguishing member and the second battery-side distinguishing member, the battery-pack-type device is prohibited (blocked) from being mistakenly mounted on an electrical device on which it is unmountable (e.g., an electrical device that should not receive power from the battery-pack-type device, e.g., because the rated voltage of the battery-pack-type device is too high). Because the second battery-side distinguishing member is connected to the other support wall of the pair of support walls and is connected to the reference surface, the strength of the (other, second) connection location between the other support wall of the pair of support walls and the reference surface can be increased by the second battery-side distinguishing member. Thus, according to the above-mentioned configuration, owing to the second battery-side distinguishing member, the strength of the battery-pack-type device at the two connection locations thereof can be further increased.

In one or more embodiments, the weight of the battery-pack-type device may be 1.5 kg or more. More specifically, the weight of the battery-pack-type device may be 2.0 kg or more.

According to the above-mentioned configuration, the weight of the battery-pack-type device is large; accordingly, even in an embodiment in which a large force is applied to the connection locations between the pair of support walls and the reference surface, it is possible to reduce the likelihood of breakage of the (first reinforced) connection location between the one support wall of the pair of support walls and the reference surface and of the (second reinforced) connection location between the other support wall of the pair of support walls and the reference surface.

EXEMPLARY EMBODIMENTS

As shown in FIG. 1, an electrical-device system 2 of the present embodiment comprises electrical devices 12, 14, 16, 18 and battery packs 22, 24, 26, 28. The battery pack 22 is mountable on the electrical devices 12, 14, 16, 18 in a detachable manner. The battery pack 24 is mountable on the electrical devices 12, 14, 16 in a detachable manner and is non-mountable (not mountable) on the electrical device 18. The battery pack 26 is mountable on the electrical devices 12, 14 in a detachable manner and is non-mountable (not mountable) on the electrical devices 16, 18. The battery pack 28 is mountable on the electrical device 12 in a detachable manner and is non-mountable (not mountable) on the electrical devices 14, 16, 18.

(Configuration of Electrical Device 12)

Figure 2:
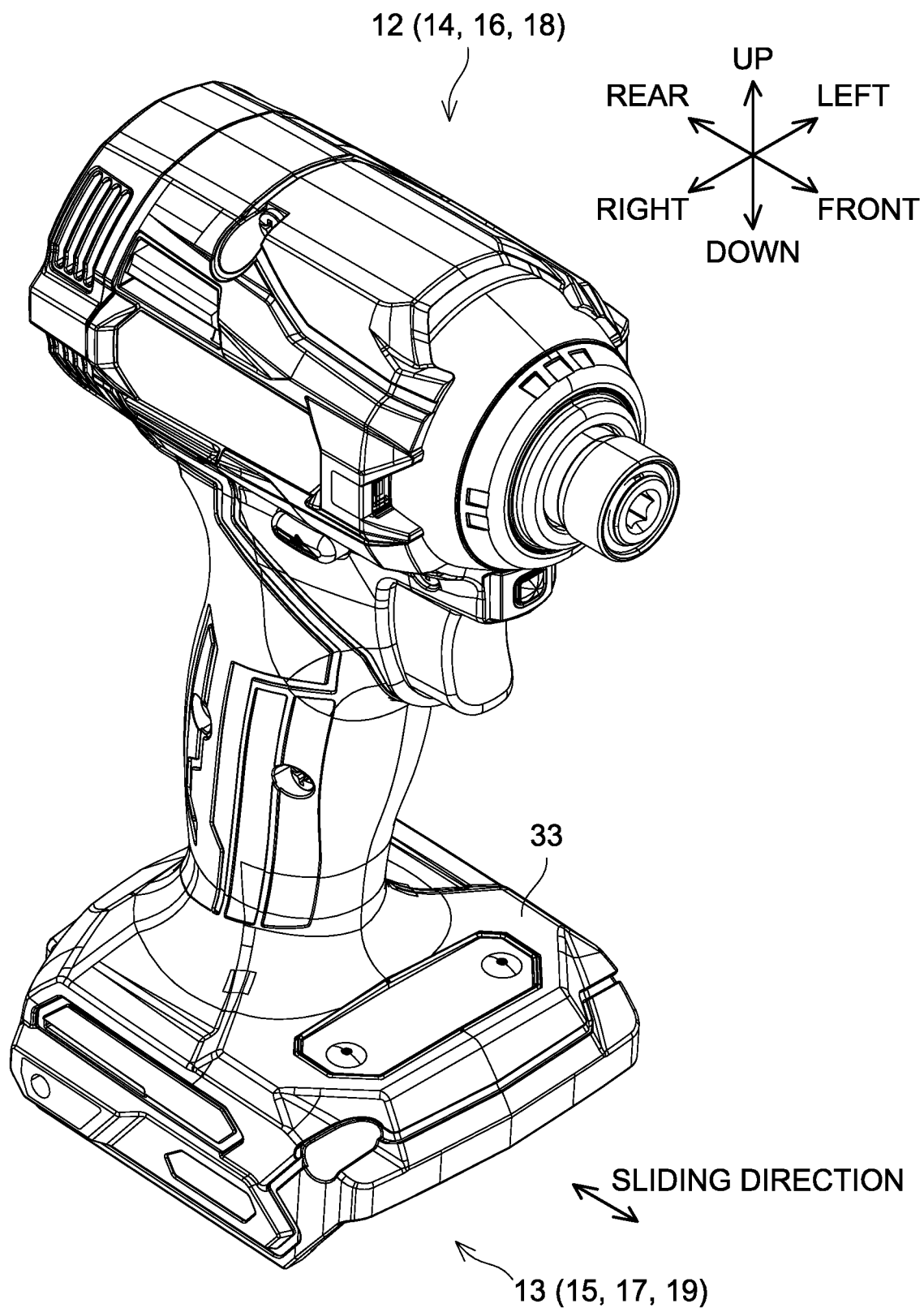
FIG. 2 is an oblique view that generally shows the external appearance of electrical devices 12 (14, 16, 18) according to the exemplary embodiment.

The electrical device 12 shown in FIG. 2 is an electrical device that operates (can be operated or driven) using electric power (current) supplied from any of the battery packs 22, 24, 26, 28. The electrical device 12 may be, for example, a power tool, such as a driver, a drill, or the like, that uses an electric motor as its motive power source, or may be an electric work machine, such as a mowing machine, a blower, or the like, that uses an electric motor as its motive power source. Alternatively, the electrical device 12 may be an electrical device, such as a light, a radio, a speaker, or the like, that does not comprise a motor. Alternatively, the electrical device 12 may be a charger that charges any of the battery packs 22, 24, 26, 28.

The electrical device 12 comprises a battery-pack mounting part 13. Each of the battery packs 22, 24, 26, 28 is mountable on the battery-pack mounting part 13 by being slid in a prescribed sliding direction relative to the battery-pack mounting part 13. Hereinbelow, the direction in which each of the battery packs 22, 24, 26, 28 is slid when being mounted on the battery-pack mounting part 13 is called a rear direction, and the direction in which each of the battery packs 22, 24, 26, 28 is slid when being detached from the battery-pack mounting part 13 is called a forward direction, as can be seen in FIG. 2. In addition, in the state in which any of the battery packs 22, 24, 26, 28 has been mounted on the battery-pack mounting part 13, the direction in which the battery-pack mounting part 13 is located, viewed from the given battery pack 22, 24, 26, 28, is called an upward direction, and the direction the reverse (opposite) of the upward direction is called a downward direction. Furthermore, the direction orthogonal to the front-rear direction and the up-down direction is called the left-right direction.

Figure 3:
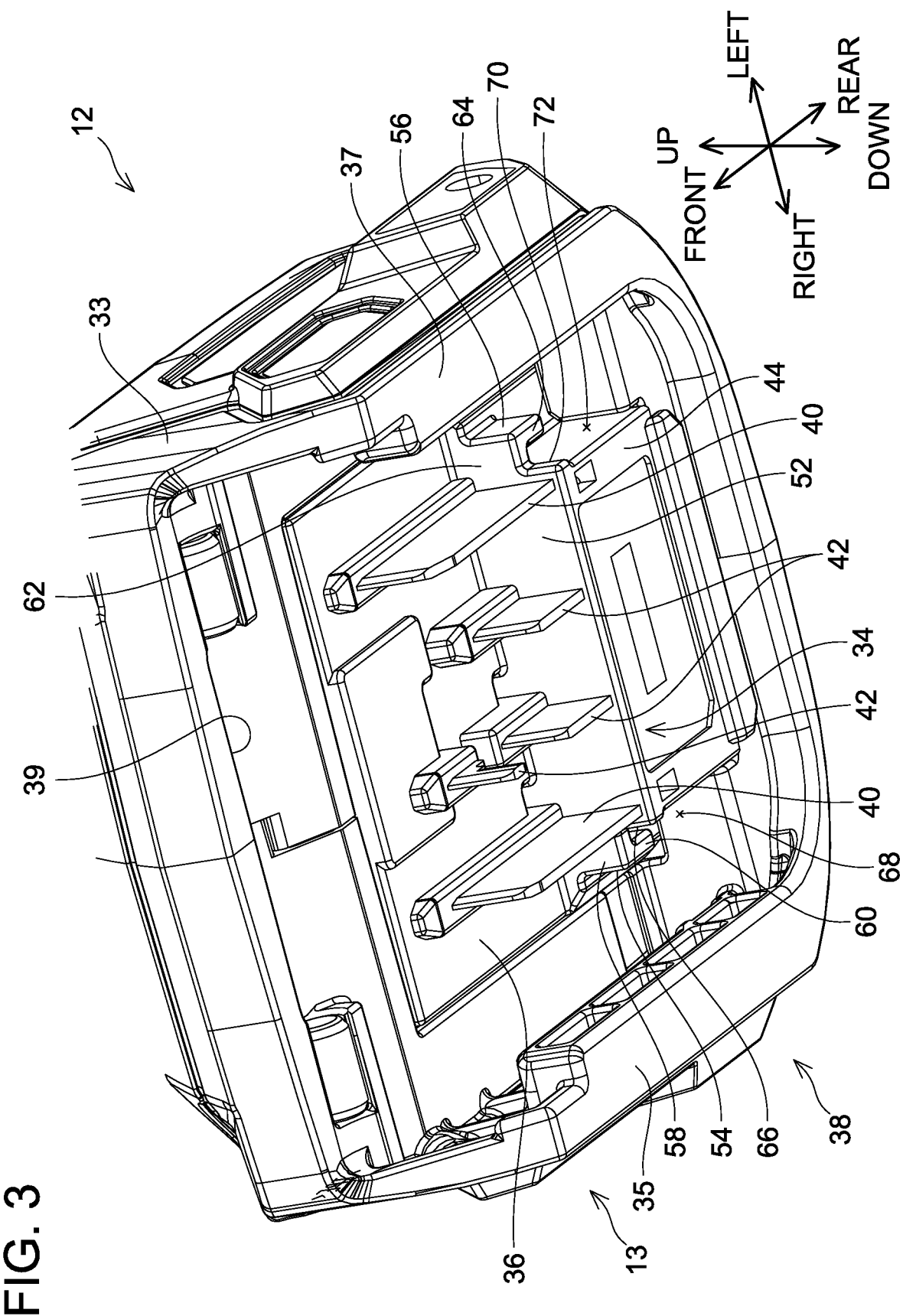
FIG. 3 is an oblique view that shows the external appearance of a battery-pack mounting part 13 of the electrical device 12 according to the exemplary embodiment.

As shown in FIG. 3, device-side terminals 34, a terminal block 36, device-side rails 38, and an engaging groove 39 are provided on the battery-pack mounting part 13. The device-side terminals 34 are made of metal; when any of the battery packs 22, 24, 26, 28 is mounted on the battery-pack mounting part 13, the device-side terminals 23 respectively mechanically engage with and are electrically connected to corresponding battery-side terminals 136 (refer to FIG. 13) of the connected one of the battery packs 22, 24, 26, 28. The device-side terminals 34 comprise two electric-power terminals 40 for charging (supplying) and discharging electric power (current) to and from the connected one of the battery packs 22, 24, 26, 28, and three signal terminals 42 for the communication of signals to and from the connected one of the battery packs 22, 24, 26, 28. It is noted that the number of signal terminals 42 is not limited to three, and the electrical device 12 may comprise one or two of the signal terminals 42 or may comprise four or more of the signal terminals 42.

Figure 4:
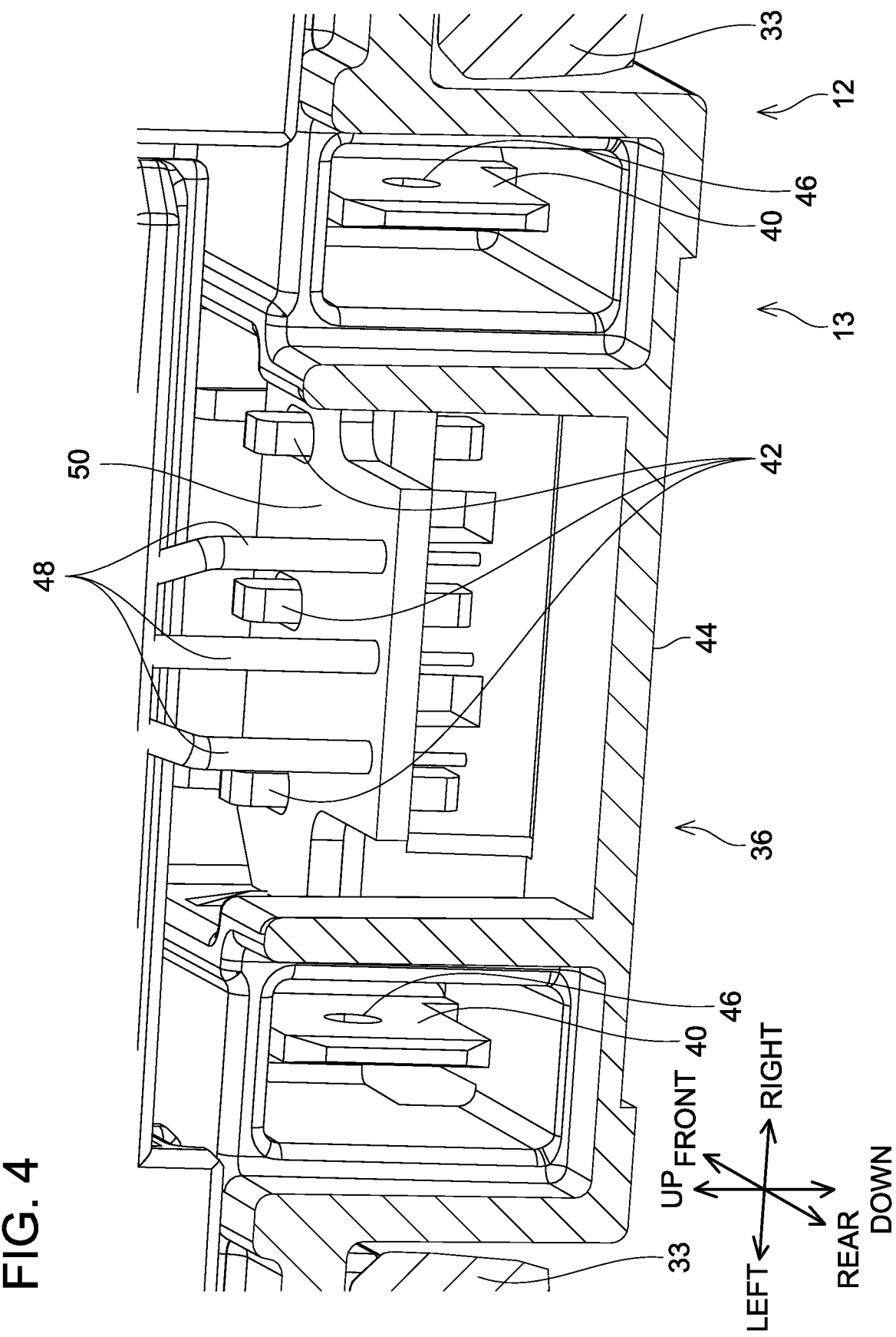
FIG. 4 is an oblique cross-sectional view of the configuration of the interior of a wiring part 44 of the electrical device 12 according to the exemplary embodiment.

The terminal block 36 is made of resin (polymer, preferably a rigid polymer) and supports the device-side terminals 34 from above and the rear. The terminal block 36 comprises a wiring part 44 disposed rearward of the device-side terminals 34. As shown in FIG. 4, the wiring part 44 houses a rear end portion of each of the electric-power terminals 40 and a rear end portion of each of the signal terminals 42. The rear end portions of each of the electric-power terminals 40 are respectively connected to terminals (not shown) provided at the terminus of an electric-power wiring (not shown) of the electrical device 12. A through hole 46, which engages with a protruding-shaped portion of the terminals of the electric-power wiring for stopping the terminals of the electric-power wiring from separating, is formed in the rear end portion of each of the electric-power terminals 40. In addition, a signal-terminal board 50, which is for connecting signal wirings 48 of the electrical device 12 and the rear ends of the signal terminals 42, is housed in the wiring part 44. As shown in FIG. 3, the terminal block 36 comprises a front plate 52. The front plate 52 is disposed in the up-down direction and the left-right direction rearward of a portion at which the device-side terminal 34 is exposed externally. In addition, the terminal block 36 comprises a right-side reinforcing part 54, which is connected to the front-right end of the wiring part 44, and a left-side reinforcing part 56, which is connected to the front-left end of the wiring part 44. The right-side reinforcing part 54 comprises a front wall 58, which extends rightward along the front plate 52 of the wiring part 44, and a right wall 60, which extends rearward from the right end of the front wall 58. The left-side reinforcing part 56 comprises a front wall 62, which extends leftward along the front plate 52 of the wiring part 44, and a left wall 64, which extends rearward from the left end of the front wall 62.

Figure 5:
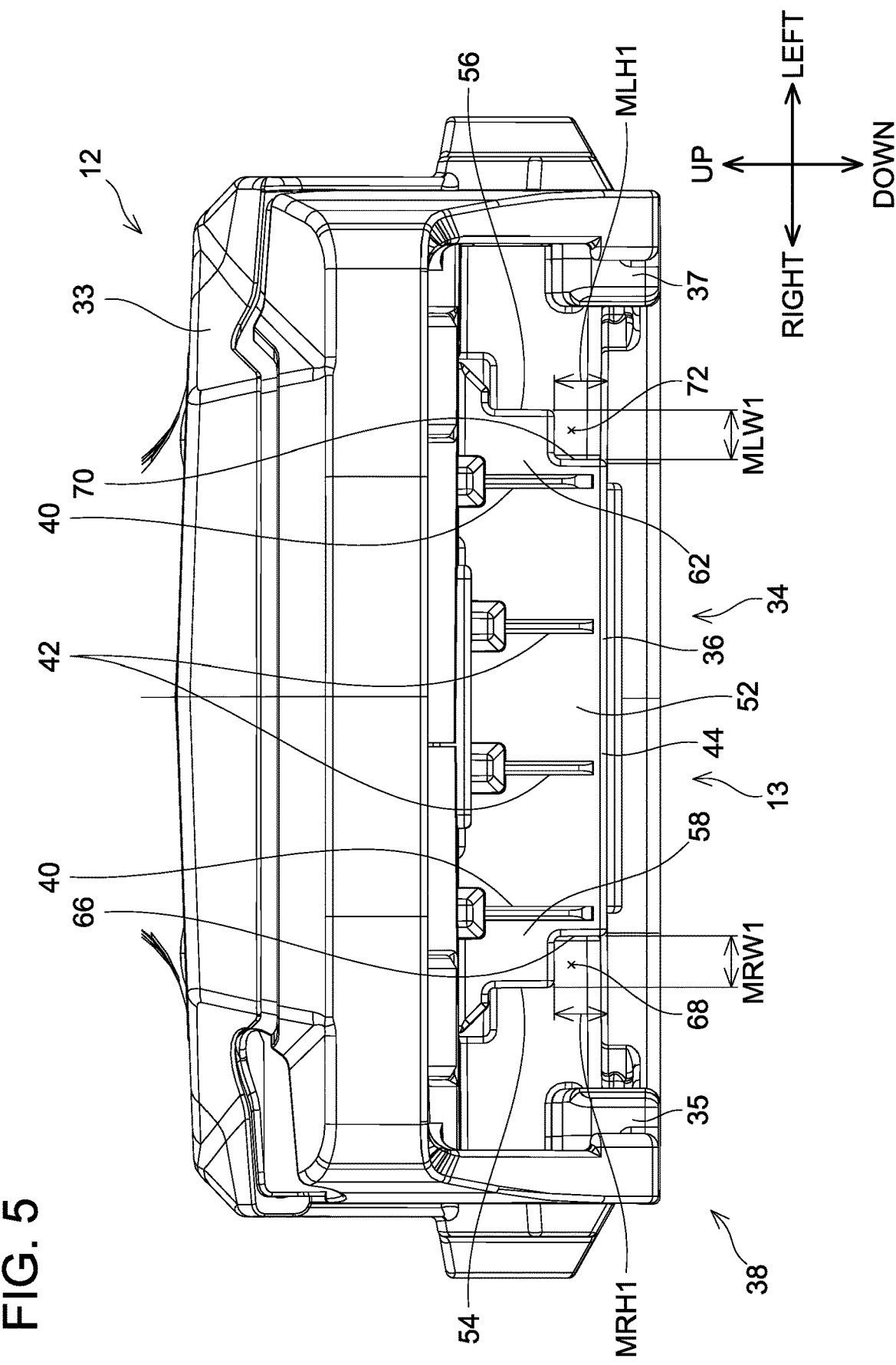
FIG. 5 is a front view of the battery-pack mounting part 13 of the electrical device 12 according to the exemplary embodiment.

As shown in FIG. 5, a substantially oblong-shaped notch (cutout, groove) 66, which has a dimension MRW1 in the left-right direction and a dimension MRH1 in the up-down direction, is formed on the lower-right end of the front wall 58 of the right-side reinforcing part 54. In the battery-pack mounting part 13, a substantially rectangular-parallelepiped-shaped space 68, which has the dimension MRW1 in the left-right direction and the dimension MRH1 in the up-down direction, is ensured (provided) rearward of the notch 66. In addition, a substantially oblong-shaped notch (cutout, groove) 70, which has a dimension MLW1 in the left-right direction and a dimension MLH1 in the up-down direction, is formed on the lower-left end of the front wall 62 of the left-side reinforcing part 56. In the battery-pack mounting part 13, a substantially rectangular-parallelepiped-shaped space 72, which has the dimension MLW1 in the left-right direction and the dimension MLH1 in the up-down direction, is ensured (provided) rearward of the notch 70.

As shown in FIG. 3, the device-side rails 38 comprise a right-side rail 35, which extends in the front-rear direction rightward of the device-side terminals 34 and the terminal block 36, and a left-side rail 37, which extends in the front-rear direction leftward of the device-side terminals 34 and the terminal block 36. The right-side rail 35 protrudes leftward from the lower end of a housing 33, which is made of resin (polymer, preferably a rigid polymer), of the electrical device 12. The left-side rail 37 protrudes rightward from the lower end of the housing 33. The engaging groove 39 is formed in the housing 33 frontward of the device-side terminals 34 and the terminal block 36 and is recessed upward.

(Configuration of Electrical Device 14)

The electrical device 14 shown in FIG. 2 is an electrical device that, the same as in the electrical device 12, operates (can be operated or driven) using electric power (current) supplied from any of the battery packs 22, 24, 26. The electrical device 14 may be, for example, a power tool, such as a driver, a drill, or the like, that uses an electric motor as its motive power source, or may be an electric work machine, such as a mowing machine, a blower, or the like, that uses an electric motor as its motive power source. Alternatively, the electrical device 14 may be an electrical device, such as a light, a radio, a speaker, or the like, that does not comprise a motor. Alternatively, the electrical device 14 may be a charger that charges any of the battery packs 22, 24, 26. The electrical device 14 comprises a battery-pack mounting part 15 instead of the battery-pack mounting part 13.

Figure 6:
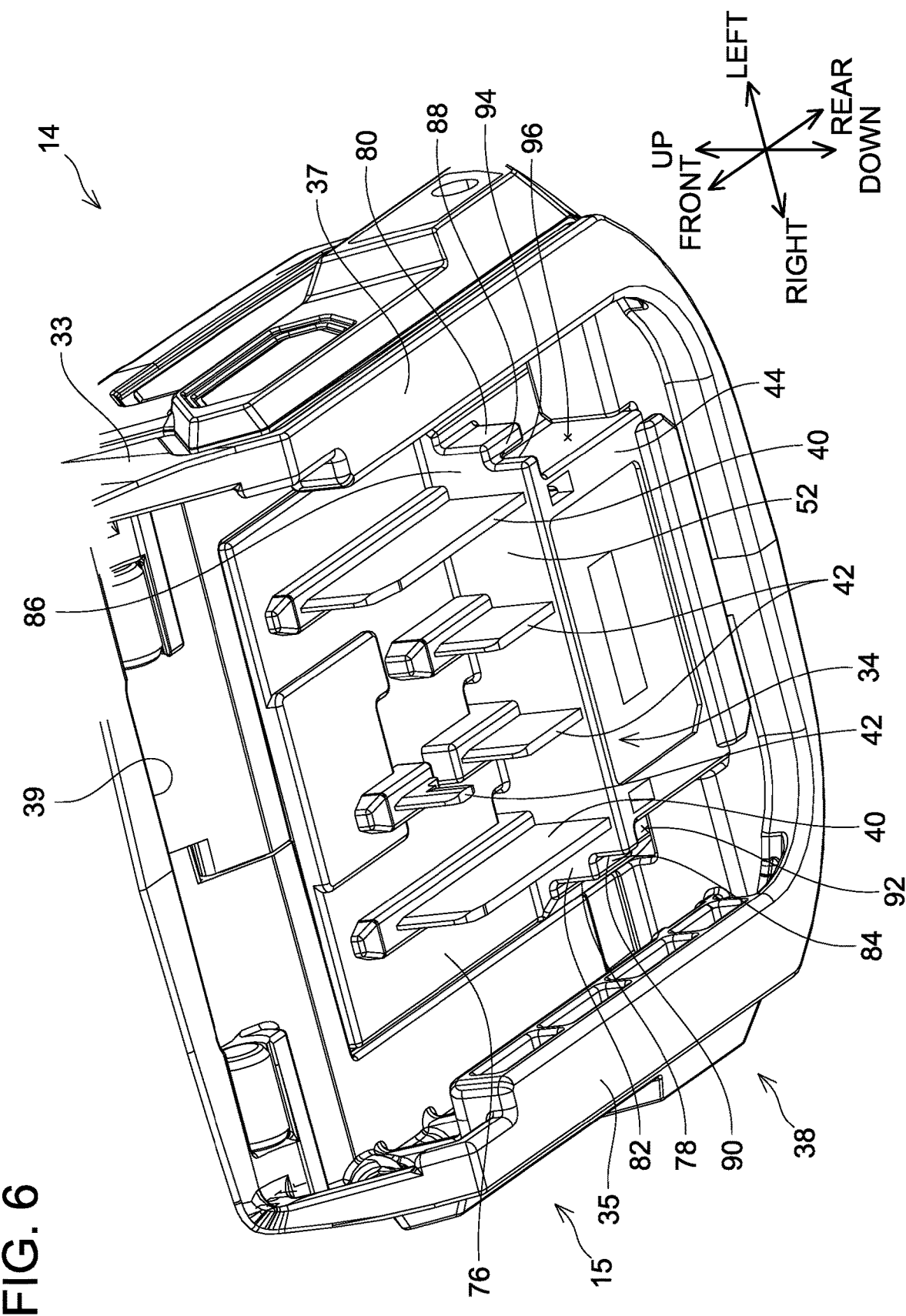
FIG. 6 is an oblique view that shows the vicinity of a battery-pack mounting part 15 of the electrical device 14 according to the exemplary embodiment.

As shown in FIG. 6, the battery-pack mounting part 15 of the electrical device 14 has substantially the same configuration as that of the battery-pack mounting part 13 of the electrical device 12. The battery-pack mounting part 15 comprises a terminal block 76 instead of the terminal block 36. The terminal block 76 comprises the wiring part 44, a right-side reinforcing part 78, which is connected to the front-right end of the wiring part 44, and a left-side reinforcing part 80, which is connected to the front-left end of the wiring part 44. The right-side reinforcing part 78 comprises a front wall 82, which extends rightward along the front plate 52 of the wiring part 44, and a right wall 84, which extends rearward from the right end of the front wall 82. The left-side reinforcing part 80 comprises a front wall 86, which extends leftward along the front plate 52 of the wiring part 44, and a left wall 88, which extends rearward from the left end of the front wall 86.

Figure 7:
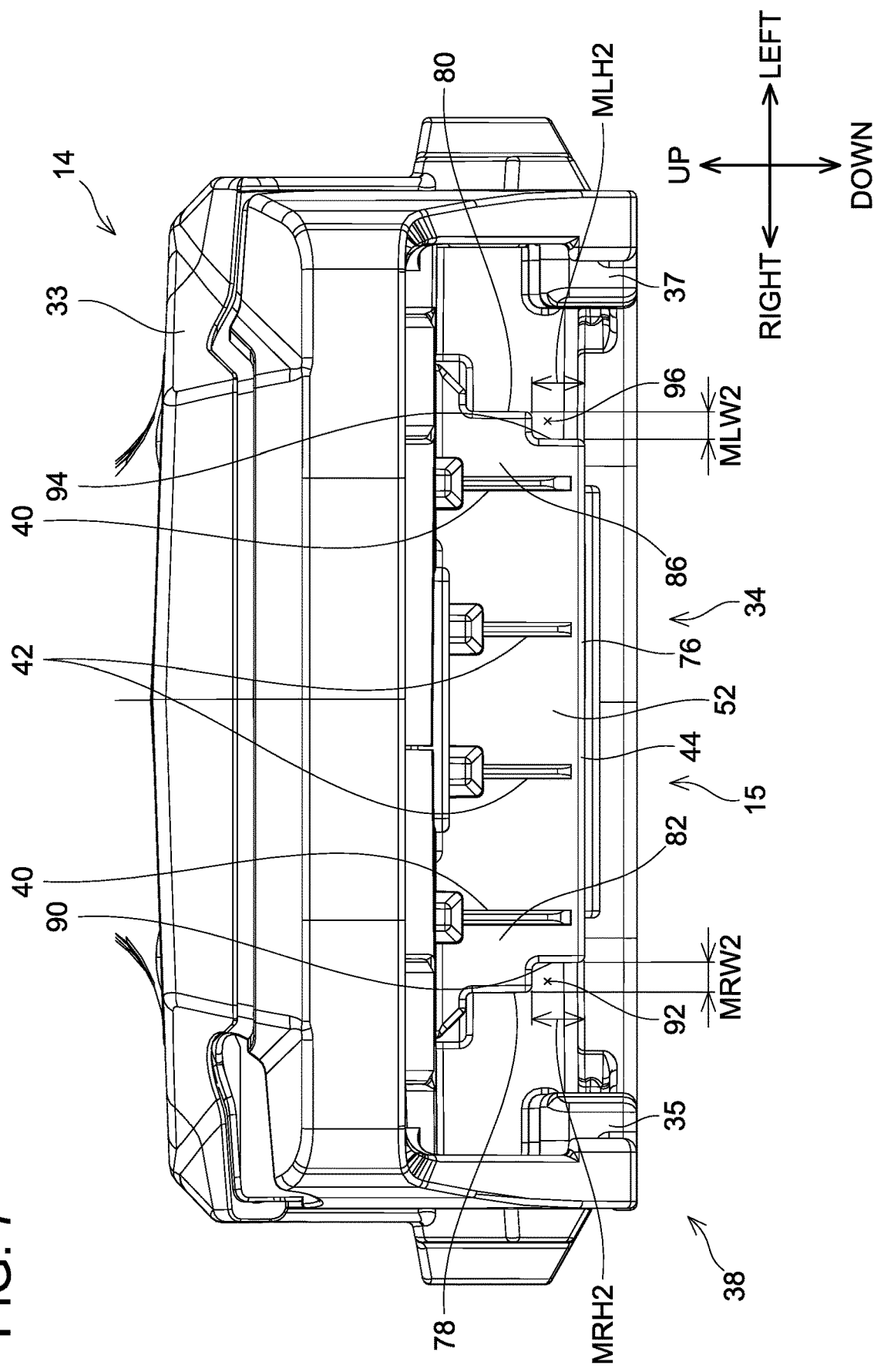
FIG. 7 is a front view of the vicinity of the battery-pack mounting part 15 of the electrical device 14 according to the exemplary embodiment.

As shown in FIG. 7, a substantially oblong-shaped notch (cutout, groove) 90, which has a dimension MRW2 in the left-right direction and a dimension MRH2 in the up-down direction, is formed on the lower-right end of the front wall 82 of the right-side reinforcing part 78. In the present embodiment, MRW2<MRW1 and MRH2=MRH1. In the battery-pack mounting part 15, a substantially rectangular-parallelepiped-shaped space 92, which has the dimension MRW2 in the left-right direction and the dimension MRH2 in the up-down direction, is ensured (provided) rearward of the notch 90. In addition, a substantially oblong-shaped notch 94, which has a dimension MLW2 in the left-right direction and a dimension MLH2 in the up-down direction, is formed on the lower-left end of the front wall 86 of the left-side reinforcing part 80. In the present embodiment, MLW2<MLW1 and MLH2=MLH1. In the battery-pack mounting part 15, a substantially rectangular-parallelepiped-shaped space 96, which has the dimension MLW2 in the left-right direction and the dimension MLH2 in the up-down direction, is ensured (provided) rearward of the notch 94.

(Configuration of Electrical Device 16)

The electrical device 16 shown in FIG. 2 is an electrical device that, the same as in the electrical device 12, operates (can be operated or driven) using electric power (current) supplied from either of the battery packs 22, 24. The electrical device 16 may be, for example, a power tool, such as a driver, a drill, or the like, that uses an electric motor as its motive power source, or may be an electric work machine, such as a mowing machine, a blower, or the like, that uses an electric motor as its motive power source. Alternatively, the electrical device 16 may be an electrical device, such as a light, a radio, a speaker, or the like, that does not comprise a motor. Alternatively, the electrical device 16 may be a charger that charges either of the battery packs 22, 24. The electrical device 16 comprises a battery-pack mounting part 17 instead of the battery-pack mounting part 13.

Figure 8:
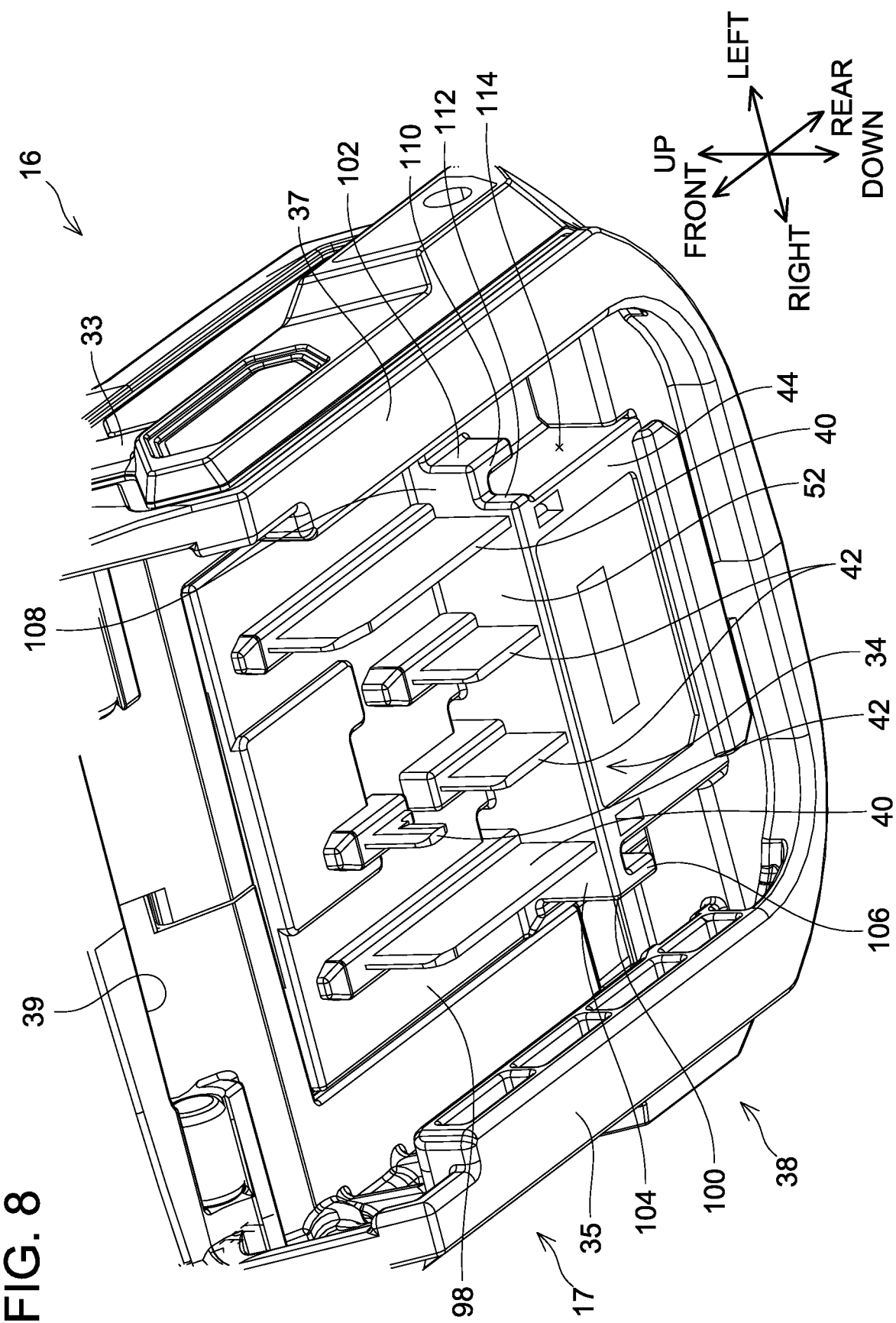
FIG. 8 is an oblique view that shows the vicinity of a battery-pack mounting part 17 of the electrical device 16 according to the exemplary embodiment.

As shown in FIG. 8, the battery-pack mounting part 17 of the electrical device 16 has substantially the same configuration as that of the battery-pack mounting part 13 of the electrical device 12. The battery-pack mounting part 17 comprises a terminal block 98 instead of the terminal block 36. The terminal block 98 comprises the wiring part 44, a right-side reinforcing part 100, which is connected to the front-right end of the wiring part 44, and a left-side reinforcing part 102, which is connected to the front-left end of the wiring part 44. The right-side reinforcing part 100 comprises a front wall 104, which extends rightward along the front plate 52 of the wiring part 44, and a right wall 106, which extends rearward from the right end of the front wall 104. The left-side reinforcing part 102 comprises a front wall 108, which extends leftward along the front plate 52 of the wiring part 44, and a left wall 110, which extends rearward from the left end of the front wall 108.

Figure 9:
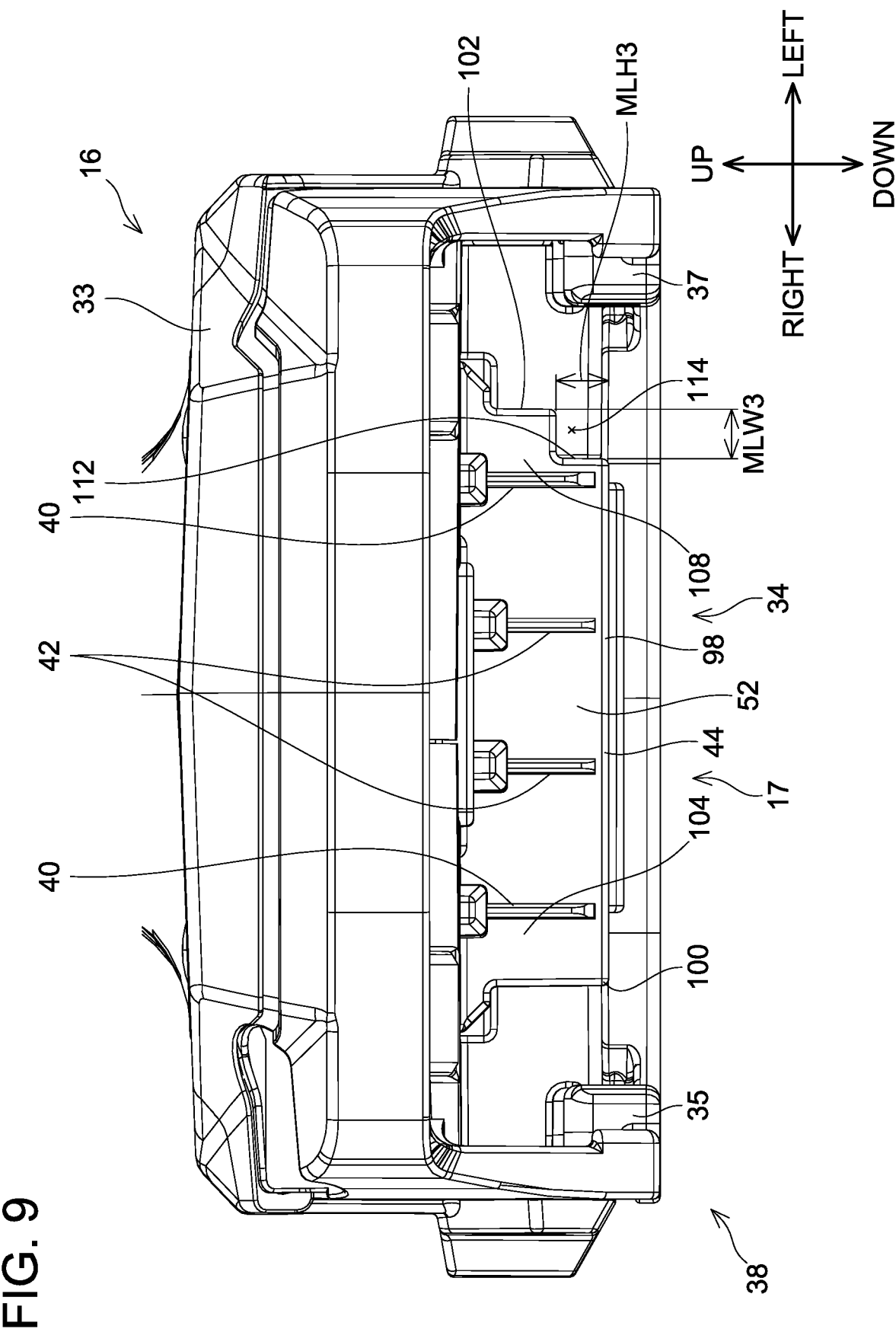
FIG. 9 is a front view of the vicinity of the battery-pack mounting part 17 of the electrical device 16 according to the exemplary embodiment.

As shown in FIG. 9, the notch (cutout, groove) 66, which is formed in the front wall 58 of the electrical device 12, and the notch (cutout, groove) 90, which is formed in the front wall 82 of the electrical device 14, are not formed in the front wall 104 of the right-side reinforcing part 100. Consequently, the space 68 provided in the right-side reinforcing part 54 of the electrical device 12 and the space 92 provided in the right-side reinforcing part 78 of the electrical device 14 are not provided in the right-side reinforcing part 100 of the electrical device 16. However, a substantially oblong-shaped notch (cutout, groove) 112, which has a dimension MLW3 in the left-right direction and a dimension MLH3 in the up-down direction, is formed on the lower-left end of the front wall 108 of the left-side reinforcing part 102. In the present embodiment, MLW3=MLW1 and MLH3=MLH1. In the battery-pack mounting part 17 of the electrical device 16, a substantially rectangular-parallelepiped-shaped space 114, which has the dimension MLW3 in the left-right direction and the dimension MLH3 in the up-down direction, is ensured (provided) rearward of the notch 112. The space 114 of the left-side reinforcing part 102 of the electrical device 16 is the same as the space 72 of the left-side reinforcing part 56 of the electrical device 12.

(Configuration of Electrical Device 18)

The electrical device 18 shown in FIG. 2 is an electrical device that, the same as in the electrical device 12, operates (can be operated or driven) using electric power (current) supplied from the battery pack 22. The electrical device 18 may be, for example, a power tool, such as a driver, a drill, or the like, that uses an electric motor as its motive power source, or may be an electric work machine, such as a mowing machine, a blower, or the like, that uses an electric motor as its motive power source. Alternatively, the electrical device 18 may be an electrical device, such as a light, a radio, a speaker, or the like, that does not comprise a motor. Alternatively, the electrical device 18 may be a charger that charges the battery pack 22. The electrical device 18 comprises a battery-pack mounting part 19 instead of the battery-pack mounting part 13.

Figure 10:
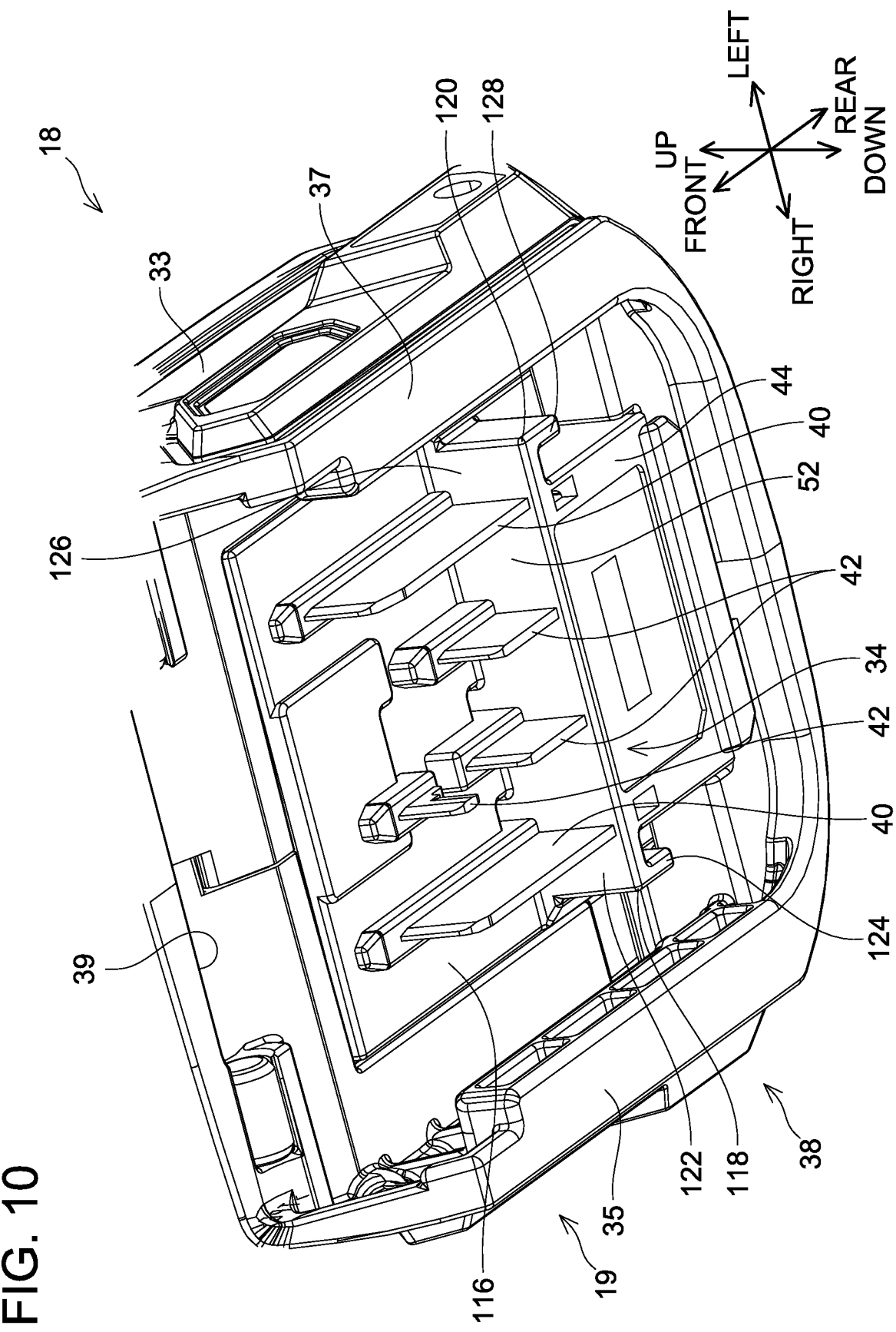
FIG. 10 is an oblique view that shows the vicinity of a battery-pack mounting part 19 of the electrical device 18 according to the exemplary embodiment.

As shown in FIG. 10, the battery-pack mounting part 19 of the electrical device 18 has substantially the same configuration as that of the battery-pack mounting part 13 of the electrical device 12. The battery-pack mounting part 19 comprises a terminal block 116 instead of the terminal block 36. The terminal block 116 comprises the wiring part 44, a right-side reinforcing part 118, which is connected to the front-right end of the wiring part 44, and a left-side reinforcing part 120, which is connected to the front-left end of the wiring part 44. The right-side reinforcing part 118 comprises a front wall 122, which extends rightward along the front plate 52 of the wiring part 44, and a right wall 124, which extends rearward from the right end of the front wall 122. The left-side reinforcing part 120 comprises a front wall 126, which extends leftward along the front plate 52 of the wiring part 44, and a left wall 128, which extends rearward from the left end of the front wall 126.

Figure 11:
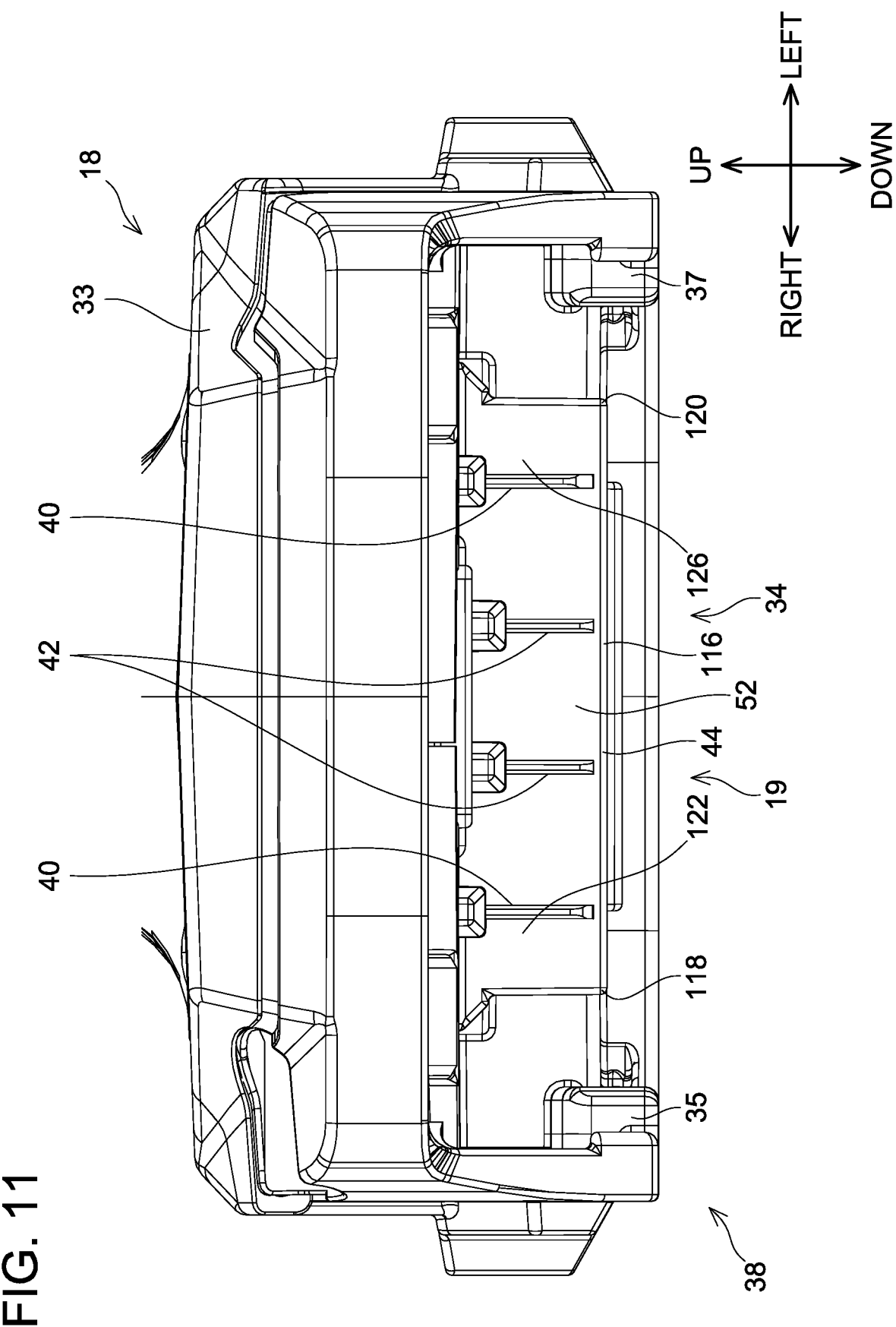
FIG. 11 is a front view of the vicinity of the battery-pack mounting part 19 of the electrical device 18 according to the exemplary embodiment.

As shown in FIG. 11, the notch (cutout, groove) 66, which is formed in the front wall 58 of the electrical device 12, and the notch (cutout, groove) 90, which is formed in the front wall 82 of the electrical device 14, are not formed in the front wall 122 of the right-side reinforcing part 118. Consequently, the space 68 provided in the right-side reinforcing part 54 of the electrical device 12 and the space 92 provided in the right-side reinforcing part 78 of the electrical device 14 are not provided in the right-side reinforcing part 118 of the electrical device 18. In addition, the notch (cutout, groove) 70, which is formed in the front wall 62 of the electrical device 12, the notch (cutout, groove) 94, which is formed in the front wall 86 of the electrical device 14, and the (cutout, groove) notch 112, which is formed in the front wall 108 of the electrical device 16, are not formed in the front wall 126 of the left-side reinforcing part 120. Consequently, the space 72 provided in the left-side reinforcing part 56 of the electrical device 12, the space 96 provided in the left-side reinforcing part 80 of the electrical device 14, and the space 114 provided in the left-side reinforcing part 102 of the electrical device 16, are not provided in the left-side reinforcing part 120 of the electrical device 18.

(Configuration of Battery Pack 22)

Figure 12:
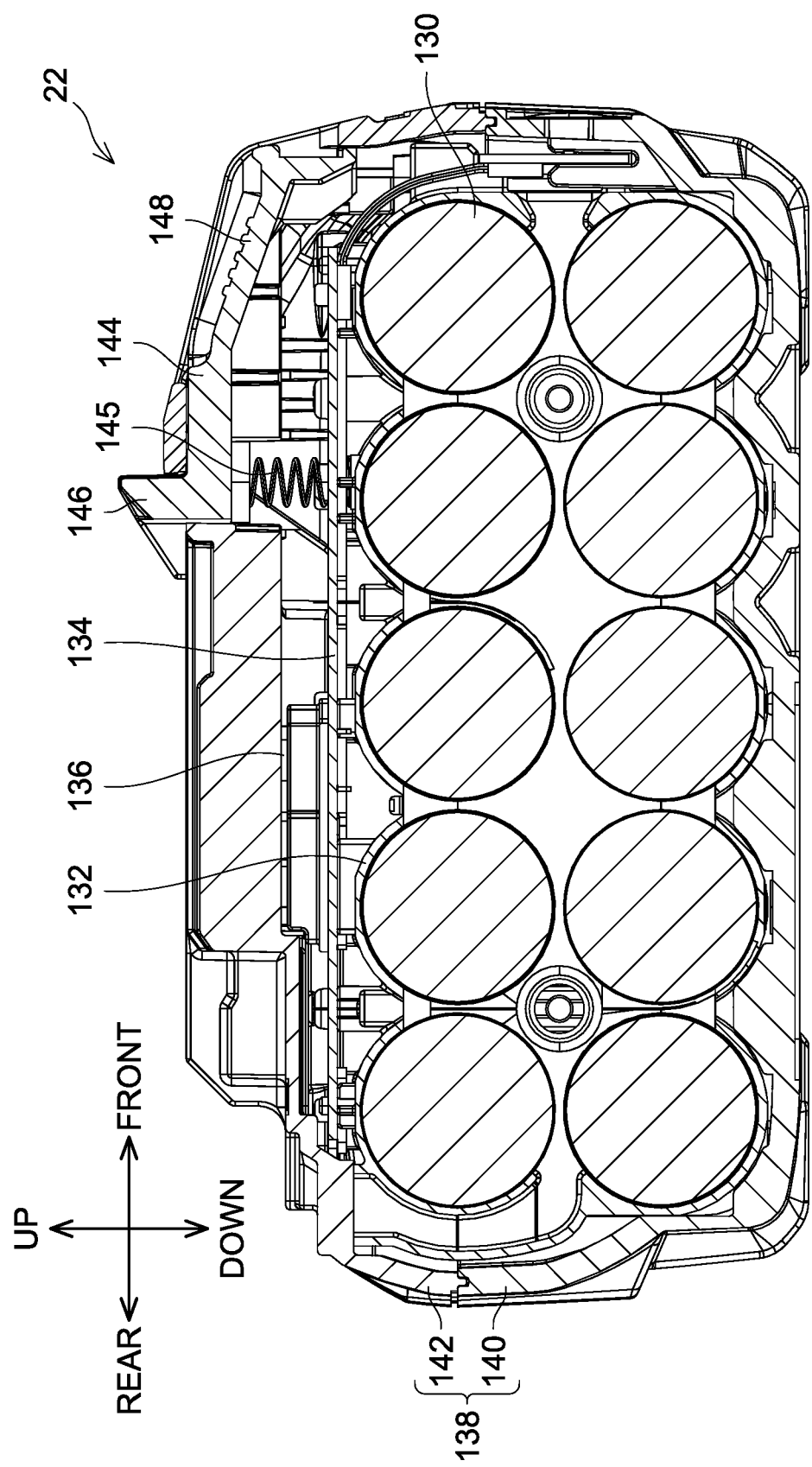
FIG. 12 is a longitudinal, cross-sectional view of a battery pack 22 according to the exemplary embodiment.

As shown in FIG. 12, the battery pack 22 comprises: battery cells 130; a cell holder 132, which holds the battery cells 130; a control board 134 held by the cell holder 132 upward of the cell holder 132 and electrically connected to the battery cells 130; the battery-side terminals 136 provided on the control board 134; and a casing 138 that houses the battery cells 130, the cell holder 132, the control board 134, and the battery-side terminals 136. The casing 138 comprises a lower-side casing (lower shell) 140 connected to an upper-side casing (upper shell) 142. A hook 144 is mounted on the upper-side casing 142. The hook 144 comprises an engaging part 146 and a manipulatable part 148. The hook 144 is biased upward by a compression spring 145. When the battery pack 22 is being mounted on any of the electrical devices 12, 14, 16, 18, the engaging part 146 of the hook 144 enters the engaging groove 39 of the connected one of the electrical devices 12, 14, 16, 18 (refer to FIG. 3, FIG. 6, FIG. 8, and FIG. 10), and thereby the battery pack 22 is fixed to the connected one of the electrical devices 12, 14, 16, 18. From this state, when the user pushes the manipulatable part 148 of the hook 144 down, the engaging part 146 separates out from the engaging groove 39. In this state, the user can slide the battery pack 22 forward relative to the connected one of the electrical devices 12, 14, 16, 18 and thereby can detach the battery pack 22 from the connected one of the electrical devices 12, 14, 16, 18.

Each of the battery cells 130 of the battery pack 22 is, for example, a 21700 type battery cell having a substantially circular-column shape with a diameter of 21 mm and a height of 70 mm. The number of battery cells 130 of the battery pack 22 is, for example, 10. The weight of the battery pack 22 is 1.1 kg or less and is, for example, 1.01 kg. In addition, the rated capacity of the battery pack 22 is, for example, 4.0 Ah. In such an embodiment, the internal resistance of the battery pack 22 is, for example, 168 mΩ, and the rated voltage of the battery pack 22 is, for example, 36 V. Alternatively, the rated capacity of the battery pack 22 may be, for example, 8.0 Ah. In such an embodiment, the internal resistance of the battery pack 22 is, for example, 42 mΩ, and the rated voltage of the battery pack 22 is, for example, 18 V.

Figure 13:
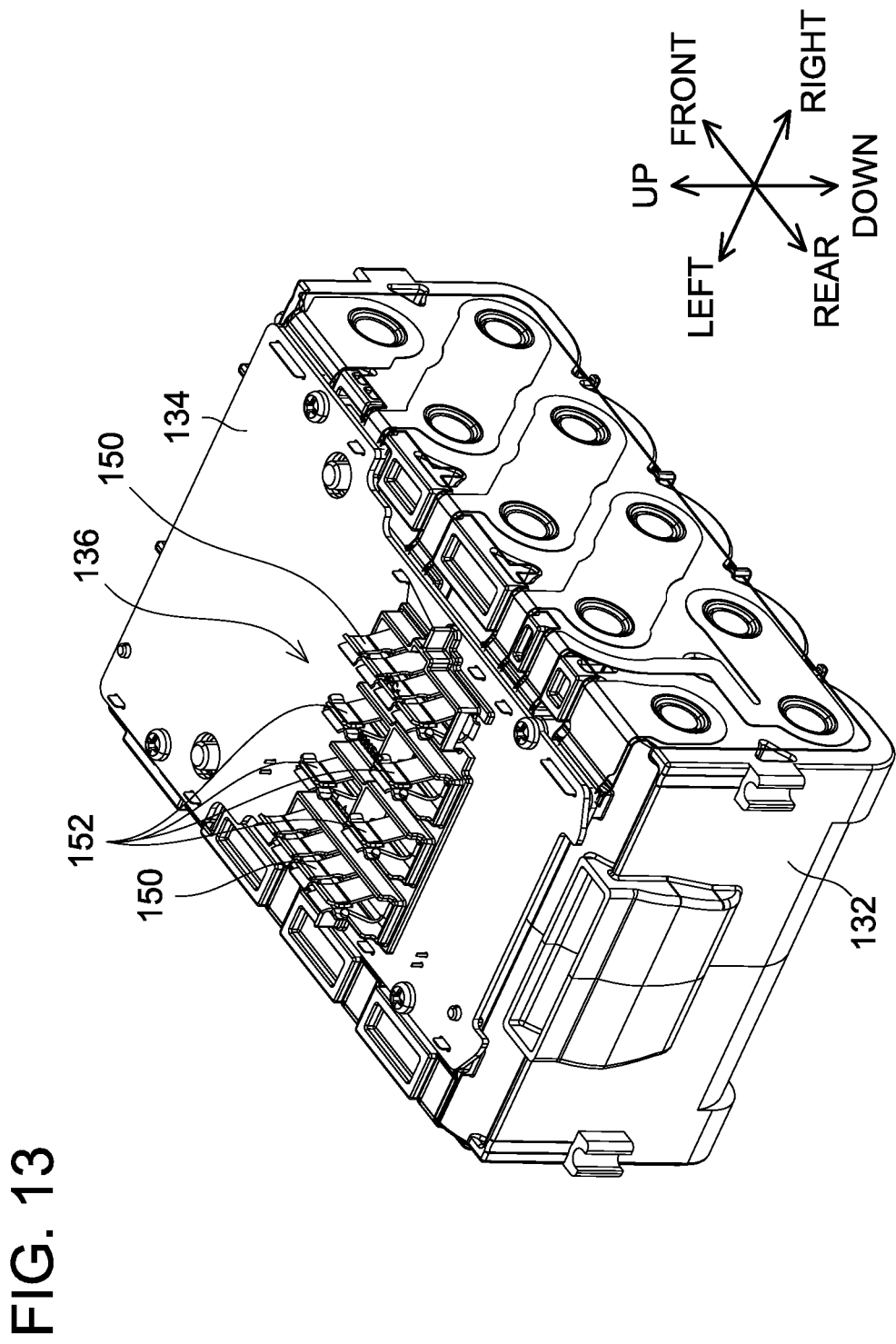
FIG. 13 is an oblique view that shows the configuration of the components disposed within a casing 138 of the battery pack 22 according to the exemplary embodiment.

As shown in FIG. 13, the battery-side terminals 136 comprise two electric-power terminals 150, which are for charging (supplying) and discharging electric power to and from any of the electrical devices 12, 14, 16, 18, and four signal terminals 152, which are for communicating signals to and from the any of electrical devices 12, 14, 16, 18. The electric-power terminals 150 are disposed at locations corresponding to the electric-power terminals 40 of the connected one of the electrical devices 12, 14, 16, 18. The signal terminals 152 are disposed at locations corresponding to the signal terminals 42 of the connected one of the electrical devices 12, 14, 16, 18.

Figure 14:
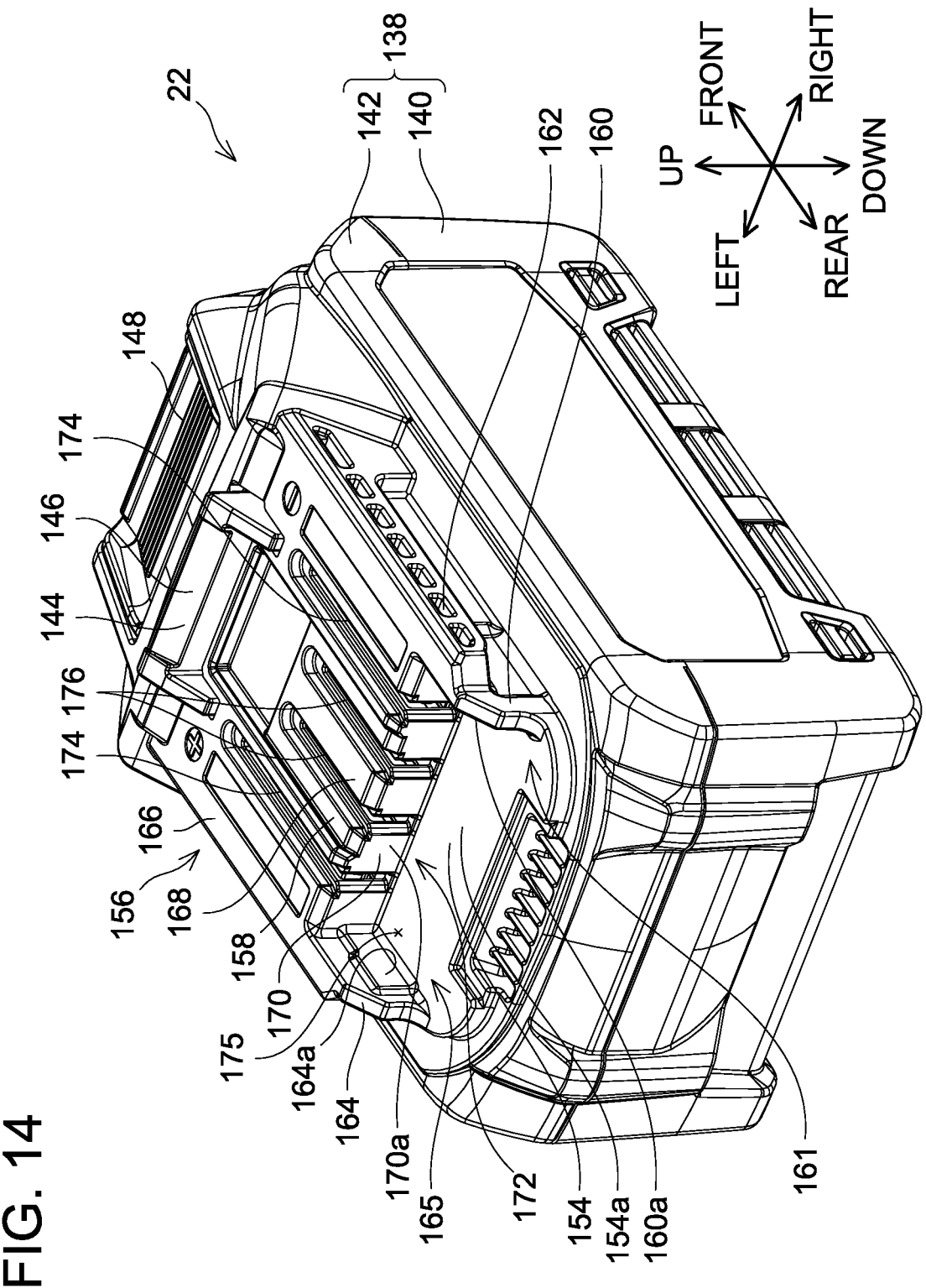
FIG. 14 is an oblique view that shows the external appearance of the battery pack 22 according to the exemplary embodiment.

As shown in FIG. 14, a base part 154, battery-side rails 156, and a terminal-housing part 158 are formed on the upper-side casing 142 of the battery pack 22. The base part 154 has an upper surface 154a extending in the front-rear direction and the left-right direction and facing upward. The battery-side rails 156 comprise: a right-side support wall 160 protruding upward from the right end of the base part 154 and extending in the front-rear direction; a right-side rail 162 protruding rightward from the upper end of the right-side support wall 160 and extending in the front-rear direction; a left-side support wall 164 protruding upward from the left end of the base part 154 and extending in the front-rear direction; and a left-side rail 166 protruding leftward from the upper end of the left-side support wall 164 and extending in the front-rear direction. The right-side support wall 160 has a side surface 160a extending in the front-rear direction and the up-down direction and facing leftward. The left-side support wall 164 has a side surface 164a extending in the front-rear direction and the up-down direction and facing rightward. The terminal-housing part 158 comprises an upper plate 168, which is disposed upward of the battery-side terminal 136, and rear plates 170, which are disposed rearward of the battery-side terminals 136. The upper plate 168 and the rear plates 170 connect the right-side support wall 160 and the left-side support wall 164 of the battery-side rail 156. The rear plates 170 have a rear surface 170a extending in the left-right direction and the up-down direction and facing rearward.

Terminal openings 172 are formed in the upper plate 168 and the rear plates 170 of the terminal-housing part 158. The terminal openings 172 provide electric-power terminal openings 174 and signal-terminal openings 176. When the battery pack 22 is being mounted on any of the electrical devices 12, 14, 16, 18, the electric-power terminals 40 of the selected one of the electrical devices 12, 14, 16, 18 respectively pass through the electric-power terminal openings 174 and enter the interior of the upper-side casing 142; similarly, the signal terminals 42 of the selected one of the electrical devices 12, 14, 16, 18 respectively pass through the signal-terminal openings 176 and enter the interior of the upper-side casing 142. Thereby, the electric-power terminals 40 and the signal terminals 42 of the selected one of the electrical devices 12, 14, 16, 18 respectively mechanically engage with and electrically connect to the electric-power terminals 150 and the signal terminals 152 of the battery pack 22.

Figure 15:
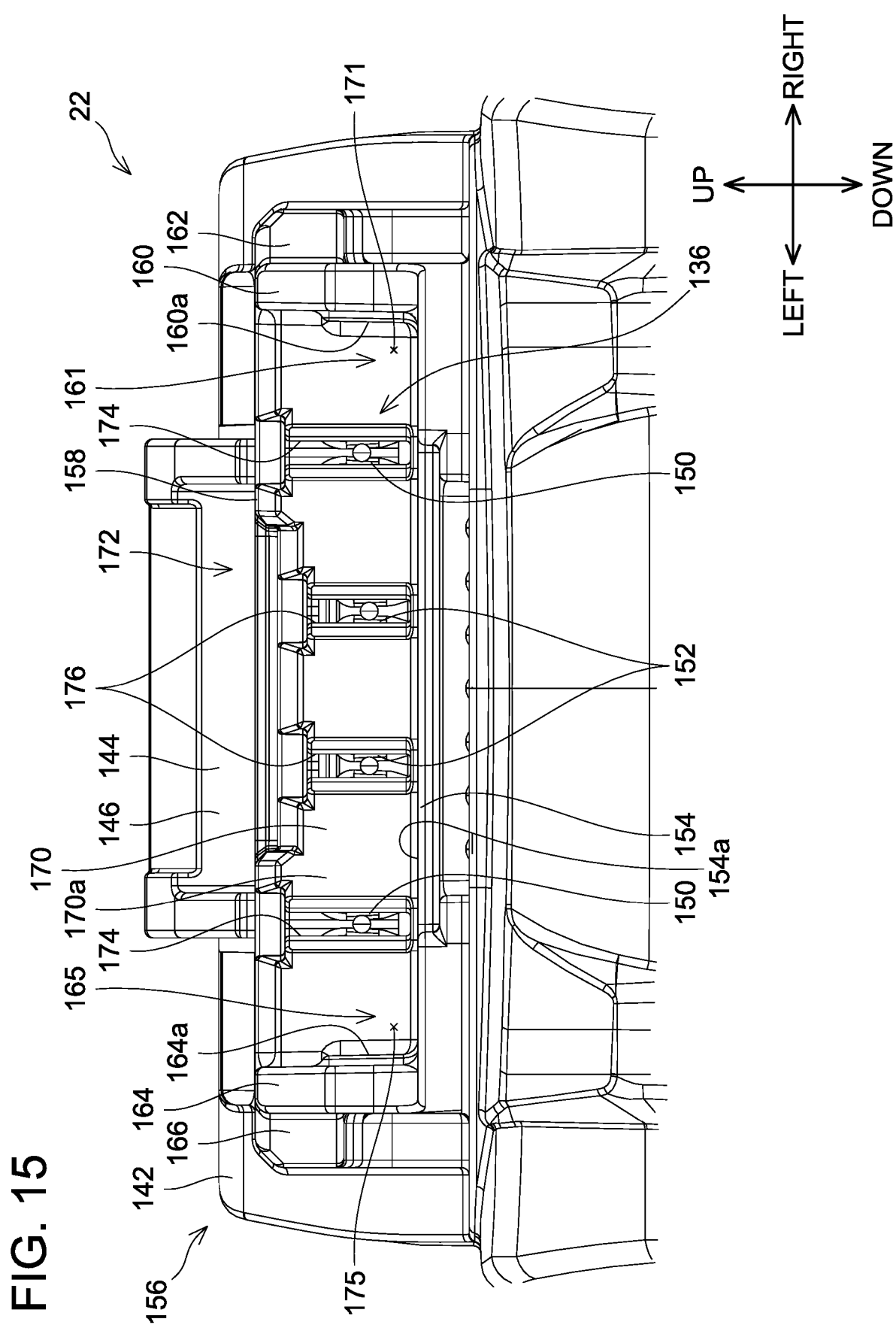
FIG. 15 is a rear view of the vicinity of an upper-side casing 142 of the battery pack 22 according to the exemplary embodiment.

As shown in FIG. 15, on the battery pack 22, a battery-side distinguishing region (battery distinctive region or battery differentiation region) 161 is provided at an upper-left portion of the location where the base part 154 connects to the right-side support wall 160, and a battery-side distinguishing region (battery distinctive region or battery differentiation region) 165 is provided at an upper-right portion of the location where the base part 154 connects to the left-side support wall 164. A space 171 is ensured (provided) in the battery-side distinguishing region 161 of the battery pack 22, but a distinguishing rib 192 (refer to FIG. 18 and FIG. 19) provided on the battery pack 26 and a distinguishing rib 202 (refer to FIG. 20 and FIG. 21) provided on the battery pack 28, all of which are described below, are not provided. In addition, a space 175 is ensured (provided) in the battery-side distinguishing region 165 of the battery pack 22. That is, the battery pack 22 does not have a distinguishing rib 184 (refer to FIG. 16 and FIG. 17), which is provided on the battery pack 24, a distinguishing rib 194 (refer to FIG. 18 and FIG. 19), which is provided on the battery pack 26, or a distinguishing rib 204 (refer to FIG. 20 and FIG. 21) which is provided on the battery pack 28, all of which battery packs 24, 26, 28 are described below. Consequently, the battery pack 22 can be mounted on any of the electrical devices 12, 14, 16, 18.

(Configuration of Battery Pack 24)

Figure 16:
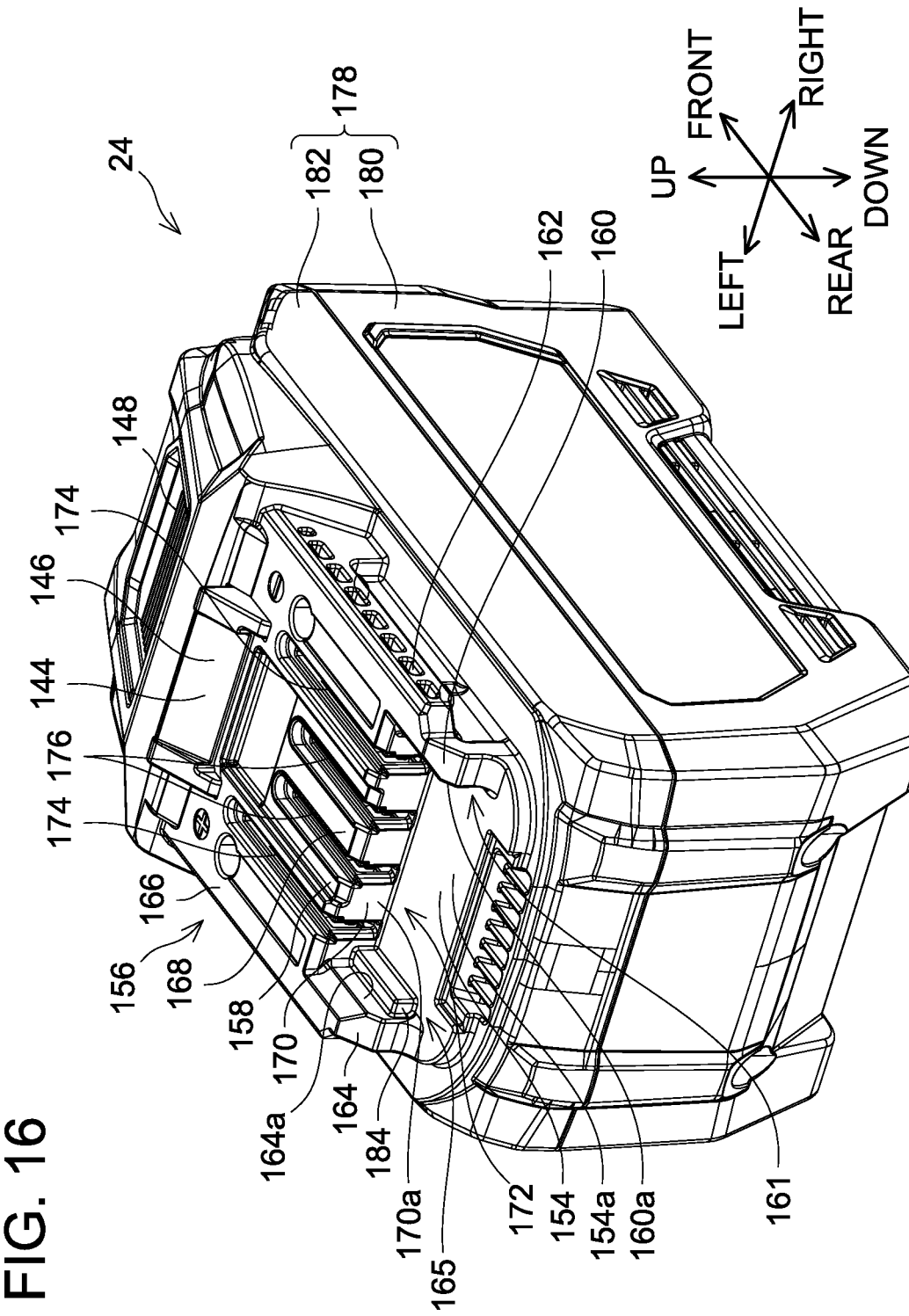
FIG. 16 is an oblique view that shows the external appearance of a battery pack 24 according to the exemplary embodiment.

The battery pack 24 shown in FIG. 16 has substantially the same configuration as that of the battery pack 22. Each of the battery cells 130 of the battery pack 24 is, for example, an 18650 type battery cell having a substantially circular-column shape with a diameter of 18 mm and a height of 65 mm. The number of the battery cells 130 of the battery pack 24 is, for example, 20. The weight of the battery pack 24 is within the range of 1.1-1.5 kg and is, for example, 1.33 kg. In addition, the rated capacity of the battery pack 24 is, for example, 5.0 Ah. In such an embodiment, the internal resistance of the battery pack 24 is, for example, 102 mΩ, and the rated voltage of the battery pack 24 is, for example, 36 V.

The battery pack 24 comprises a casing 178 instead of the casing 138. The casing 178 comprises a lower-side casing (lower shell) 180 connected to an upper-side casing (upper shell) 182. The lower-side casing 180 and the upper-side casing 182 have substantially the same configuration as that of the lower-side casing 140 and the upper-side casing 142 of the battery pack 22. The shapes of the lower-side casing 180 and the upper-side casing 182 differ from those of the lower-side casing 140 and the upper-side casing 142 of the battery pack 22 because the shape, number, and the like of the battery cells 130 housed therein are different.

Figure 17:
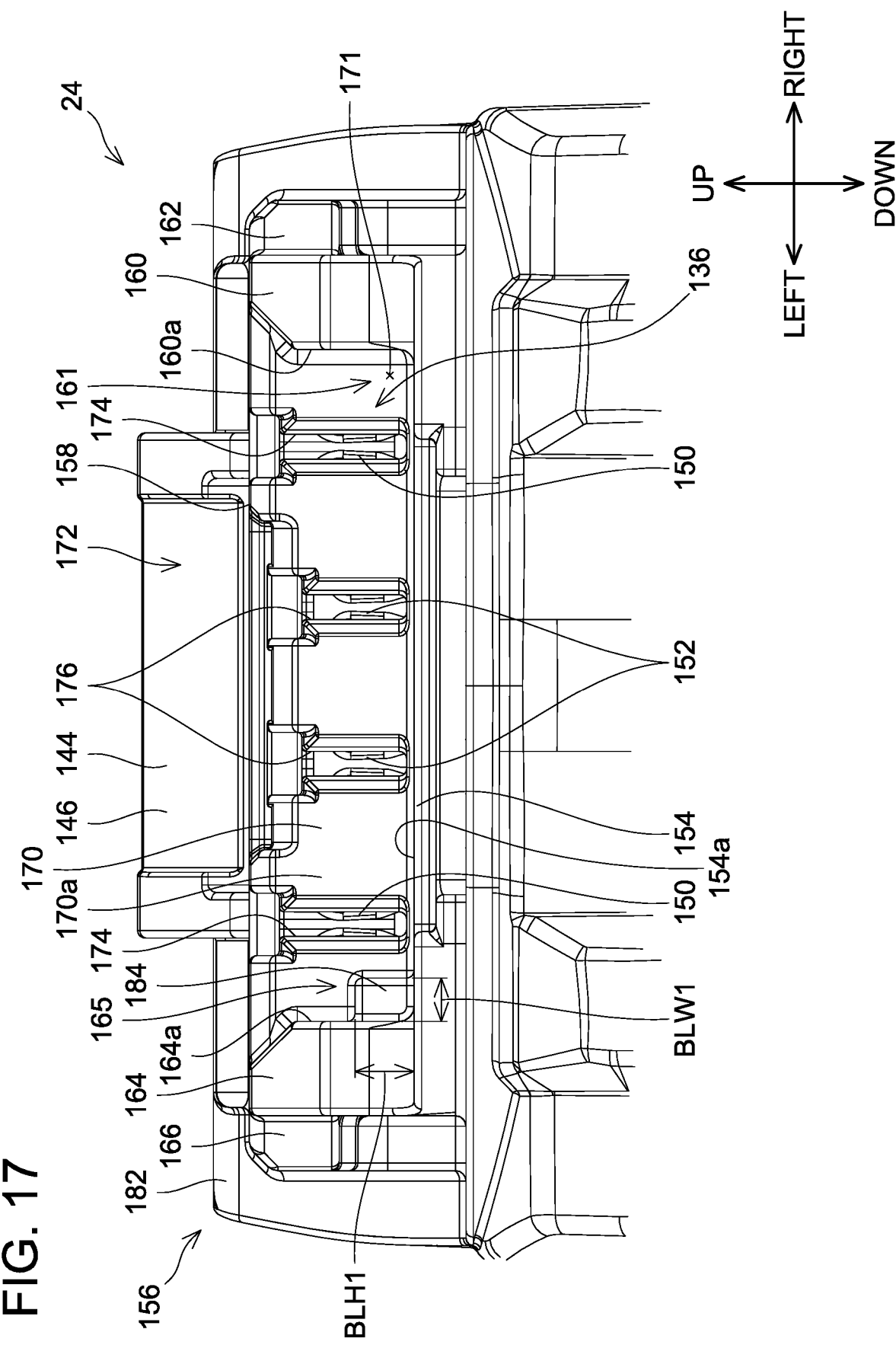
FIG. 17 is a rear view that shows the vicinity of an upper-side casing 182 of the battery pack 24 according to the exemplary embodiment.

As shown in FIG. 17, in the upper-side casing 182 of the battery pack 24, a space 171 is ensured (provided) at the upper-left portion of the location where the base part 154 connects to the right-side support wall 160, that is, in the battery-side distinguishing region 161. In the upper-side casing 182 of the battery pack 24, the distinguishing rib 184 is formed at the upper-right portion of the location where the base part 154 connects to the left-side support wall 164, that is, in the battery-side distinguishing region 165. A distinguishing rib (shoulder, protrusion, or differentiation/distinctive rib, shoulder or protrusion) 184 has a substantially polygonal-column shape, whose longitudinal direction is in the front-rear direction. The distinguishing rib 184 has a substantially oblong, cross-sectional shape. The rear end of the distinguishing rib 184 is connected to the rear surface 170a of the rear plate 170 of the terminal-housing part 158.

The lower end (side, portion) of the distinguishing rib 184 is connected to the upper surface 154a of the base part 154. The left end (side, portion) of the distinguishing rib 184 is connected to the side surface 164a of the left-side support wall 164. The distinguishing rib 184 has a dimension BLW1 in the left-right direction and a dimension BLH1 in the up-down direction. The distinguishing rib 184 has a shape and dimensions such that it is capable of passing through (moving past): (i) the notch 70 of the front wall 62 of the left-side reinforcing part 56 of the electrical device 12, (ii) the notch 94 of the front wall 86 of the left-side reinforcing part 80 of the electrical device 14, and (iii) the notch 112 of the front wall 108 of the left-side reinforcing part 102 of the electrical device 16.

When the battery pack 24 is slid rearward relative to any of the battery-pack mounting parts 13, 15, 17 (refer to FIG. 5, FIG. 7, and FIG. 9) of the corresponding electrical devices 12, 14, 16, the distinguishing rib 184 passes through (moves past) the corresponding notch 70, 94, 112 and is housed (disposed) in the corresponding space 72, 96, 114. Consequently, the battery pack 24 can be mounted on any of the electrical devices 12, 14, 16 without the distinguishing rib 184 adversely interfering with (being blocked by) the corresponding left-side reinforcing part 56, 80, 102.

In contrast, when the battery pack 24 is slid rearward relative to the battery-pack mounting part 19 (refer to FIG. 11) of the electrical device 18, the distinguishing rib 184 interferes with (is blocked by) the left-side reinforcing part 120, and therefore the battery pack 24 cannot be slid rearward beyond the left-side reinforcing part 120. Consequently, the battery pack 24 cannot be (is prevented or blocked from being) mounted on (and thus cannot be electrically connected to) the electrical device 18.

(Configuration of Battery Pack 26)

Figure 18:
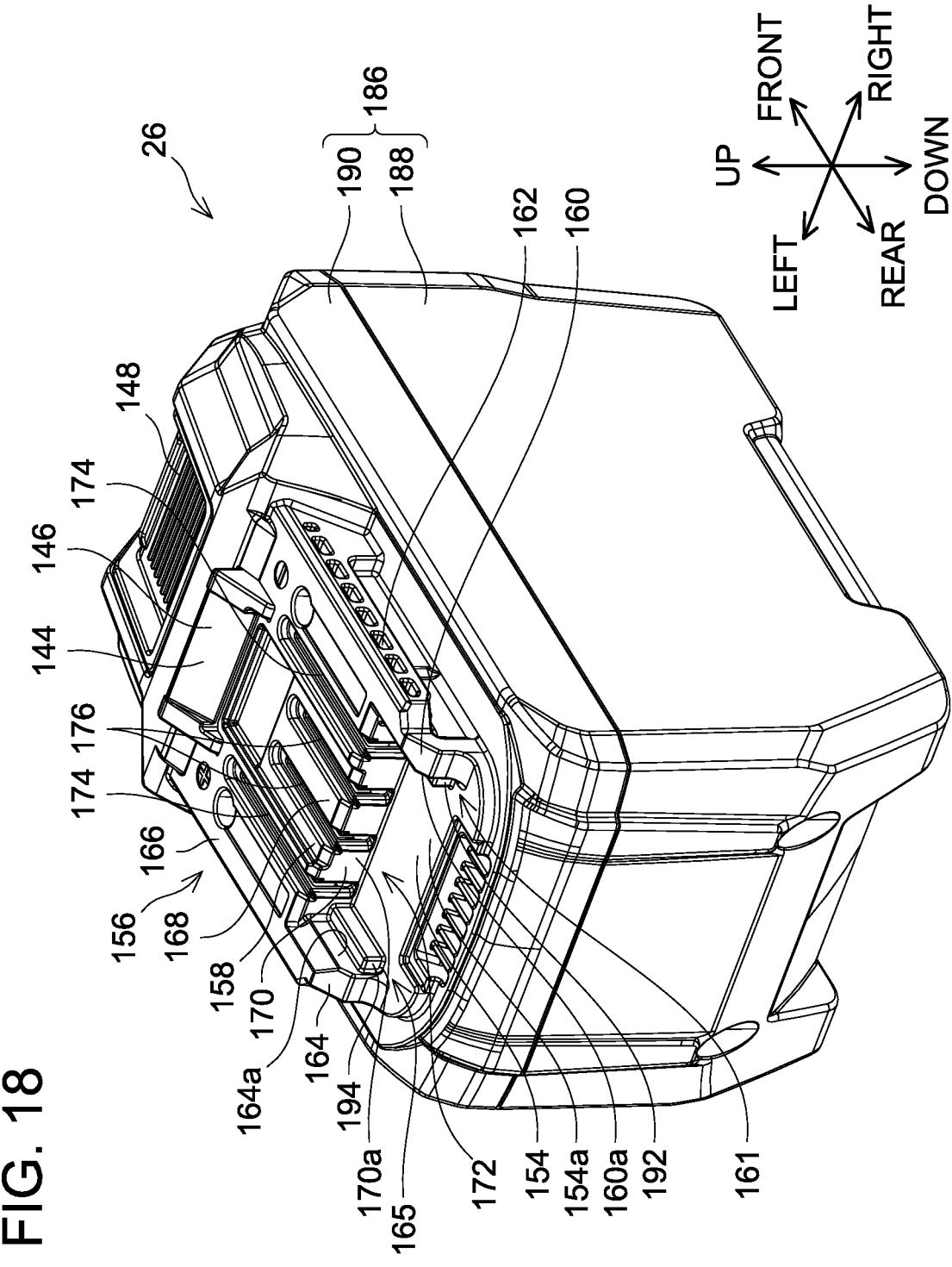
FIG. 18 is an oblique view that shows the external appearance of a battery pack 26 according to the exemplary embodiment.

The battery pack 26 shown in FIG. 18 has substantially the same configuration as that of the battery pack 22. Each of the battery cells 130 of the battery pack 26 is, for example, a 21700 type battery cell having a substantially circular-column shape with a diameter of 21 mm and a height of 70 mm. The number of the battery cells 130 of the battery pack 26 is, for example, 20. The weight of the battery pack 26 is within the range of 1.5-2.0 kg and is, for example, 1.85 kg. In addition, the rated capacity of the battery pack 26 is, for example, 8.0 Ah. In such an embodiment, the internal resistance of the battery pack 26 is, for example, 75 mΩ, and the rated voltage of the battery pack 26 is, for example, 36 V. Alternatively, the rated capacity of the battery pack 26 may be, for example, 4.0 Ah. In such an embodiment, the internal resistance of the battery pack 26 is, for example, 300 mΩ, and the rated voltage of the battery pack 26 is, for example, 72 V.

The battery pack 26 comprises a casing 186 instead of the casing 138. The casing 186 comprises a lower-side casing (lower shell) 188 connected to an upper-side casing (upper shell) 190. The lower-side casing 188 and the upper-side casing 190 have substantially the same configuration as that of the lower-side casing 140 and the upper-side casing 142 of the battery pack 22. The shapes of the lower-side casing 188 and the upper-side casing 190 differ from those of the lower-side casing 140 and the upper-side casing 142 of the battery pack 22 because the number of the battery cells 130 housed therein is different.

Figure 19:
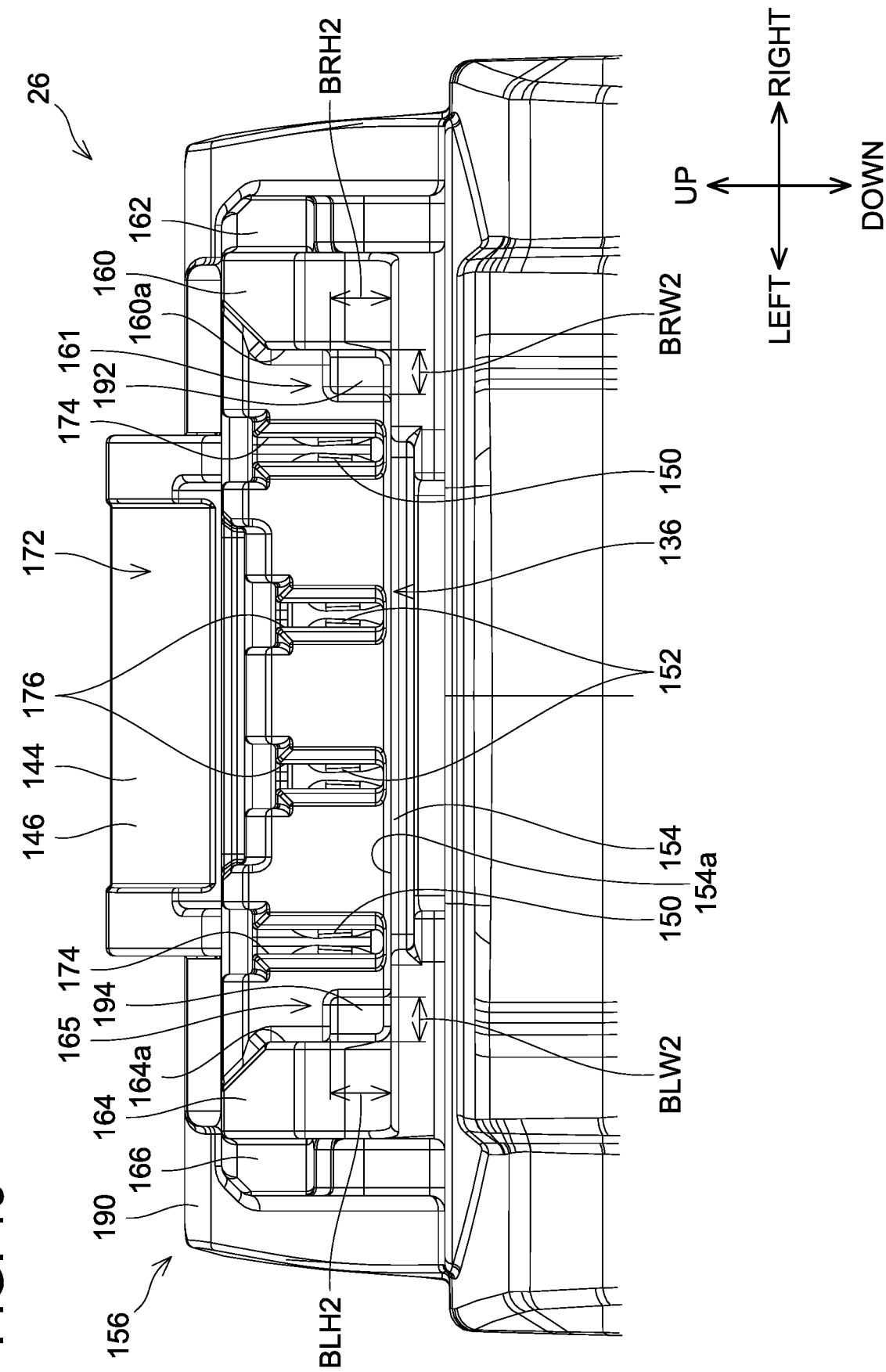
FIG. 19 is a rear view of the vicinity of an upper-side casing 190 of the battery pack 26 according to the exemplary embodiment.

As shown in FIG. 19, in the upper-side casing 190 of the battery pack 26, a (first) distinguishing rib (shoulder, protrusion, or differentiation/distinctive rib, shoulder or protrusion) 192 is formed at the upper-left portion of the location where the base part 154 connects to the right-side support wall 160, that is, in the battery-side distinguishing region 161. In addition, in the upper-side casing 190 of the battery pack 26, a (second) distinguishing rib (shoulder, protrusion, or differentiation/distinctive rib, shoulder or protrusion) 194 is formed at the upper-right portion of the location where the base part 154 connects to the left-side support wall 164, that is, in the battery-side distinguishing region 165. The distinguishing ribs 192, 194 each have a substantially polygonal-column shape, whose longitudinal direction is in the front-rear direction. The distinguishing ribs 192, 194 each have a substantially oblong, cross-sectional shape. The rear ends of the distinguishing ribs 192, 194 each are connected to the rear surface 170a of the rear plate 170 of the terminal-housing part 158.

The lower end (side, portion) of the distinguishing rib 192 is connected to the upper surface 154a of the base part 154. The right end (side, portion) of the distinguishing rib 192 is connected to the side surface 160a of the right-side support wall 160. The distinguishing rib 192 has a dimension BRW2 in the left-right direction and a dimension BRH2 in the up-down direction. The distinguishing rib 192 has a shape and dimensions such that it is capable of passing through (moving past): (i) the notch 66 of the front wall 58 of the right-side reinforcing part 54 of the electrical device 12 and (ii) the notch 90 of the front wall 82 of the right-side reinforcing part 78 of the electrical device 14. The lower end of the distinguishing rib 194 is connected to the upper surface 154a of the base part 154. The left end of the distinguishing rib 194 is connected to the side surface 164a of the left-side support wall 164. The distinguishing rib 194 has a dimension BLW2 in the left-right direction and a dimension BLH2 in the up-down direction. The distinguishing rib 194 has a shape and dimensions such that it is capable of passing through (moving past): (i) the notch 70 of the front wall 62 of the left-side reinforcing part 56 of the electrical device 12, (ii) the notch 94 of the front wall 86 of the left-side reinforcing part 80 of the electrical device 14, and (iii) the notch 112 of the front wall 108 of the left-side reinforcing part 102 of the electrical device 16.

When the battery pack 26 is slid rearward relative to the either of the battery-pack mounting parts 13, 15 (refer to FIG. 5 and FIG. 7) of the corresponding electrical device 12, 14, the distinguishing rib 192 passes through (moves past) the corresponding notch 66, 90 and is housed (disposed) in the corresponding space 68, 92, and the distinguishing rib 194 passes through (moves past) the corresponding notch 70, 94 and is housed (disposed) in the corresponding space 72, 96. Consequently, because the distinguishing rib 192 does not adversely interfere with (is not blocked by) the corresponding right-side reinforcing part 54, 78 and the distinguishing rib 194 does not adversely interfere with (is not blocked by) the corresponding left-side reinforcing part 56, 80, the battery pack 26 can be mounted on either of the electrical devices 12, 14.

In contrast, when the battery pack 26 is slid rearward relative to the battery-pack mounting part 17 (refer to FIG. 9) of the electrical device 16, the distinguishing rib 192 interferes with (is blocked by) the right-side reinforcing part 100, and therefore the battery pack 26 cannot be slid rearward beyond the right-side reinforcing part 100. In addition, when the battery pack 26 is slid rearward relative to the battery-pack mounting part 19 (refer to FIG. 11) of the electrical device 18, the distinguishing rib 192 interferes with (is blocked by) the right-side reinforcing part 118 and the distinguishing rib 194 interferes with (is blocked by) the left-side reinforcing part 120, and therefore the battery pack 26 cannot be slid rearward beyond that. Consequently, the battery pack 26 cannot be (is prevented or blocked from being) mounted on (and thus cannot be electrically connected to) either of the electrical devices 16, 18.

(Configuration of Battery Pack 28)

Figure 20:
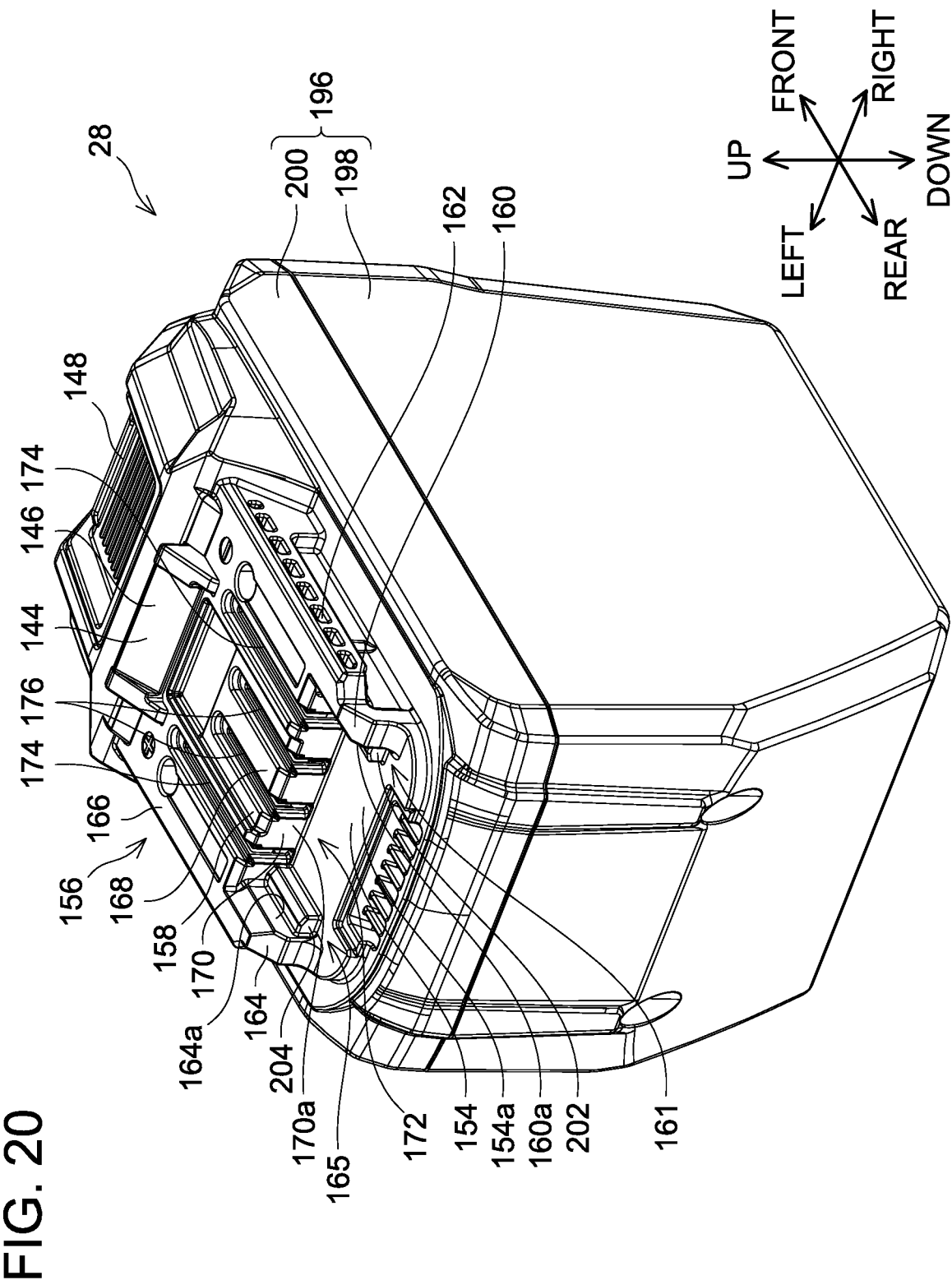
FIG. 20 is an oblique view that shows the external appearance of a battery pack 28 according to the exemplary embodiment.

The battery pack 28 shown in FIG. 20 has substantially the same configuration as that of the battery pack 22. Each of the battery cells 130 of the battery pack 28 is, for example, a 21700 type battery cell having a substantially circular-column shape with a diameter of 21 mm and a height of 70 mm. The number of the battery cells 130 of the battery pack 28 is, for example, 30. The weight of the battery pack 28 is 2.0 kg or more and is, for example, 2.7 kg. In addition, the rated capacity of the battery pack 28 is, for example, 12.0 Ah. In such an embodiment, the internal resistance of the battery pack 28 is, for example, 50 mΩ, and the rated voltage of the battery pack 28 is, for example, 36 V. Alternatively, the rated capacity of the battery pack 28 may be, for example, 4.0 Ah. In such an embodiment, the internal resistance of the battery pack 28 is, for example, 450 mΩ, and the rated voltage of the battery pack 28 is, for example, 108 V.

The battery pack 28 comprises a casing 196 instead of the casing 138. The casing 196 comprises a lower-side casing (lower shell) 198 connected to an upper-side casing (upper shell) 200. The lower-side casing 198 and the upper-side casing 200 have substantially the same configuration as that of the lower-side casing 140 and the upper-side casing 142 of the battery pack 22. The shapes of the lower-side casing 198 and the upper-side casing 200 differ from those of the lower-side casing 140 and the upper-side casing 142 of the battery pack 22 because the number of the battery cells 130 housed therein is different.

Figure 21:
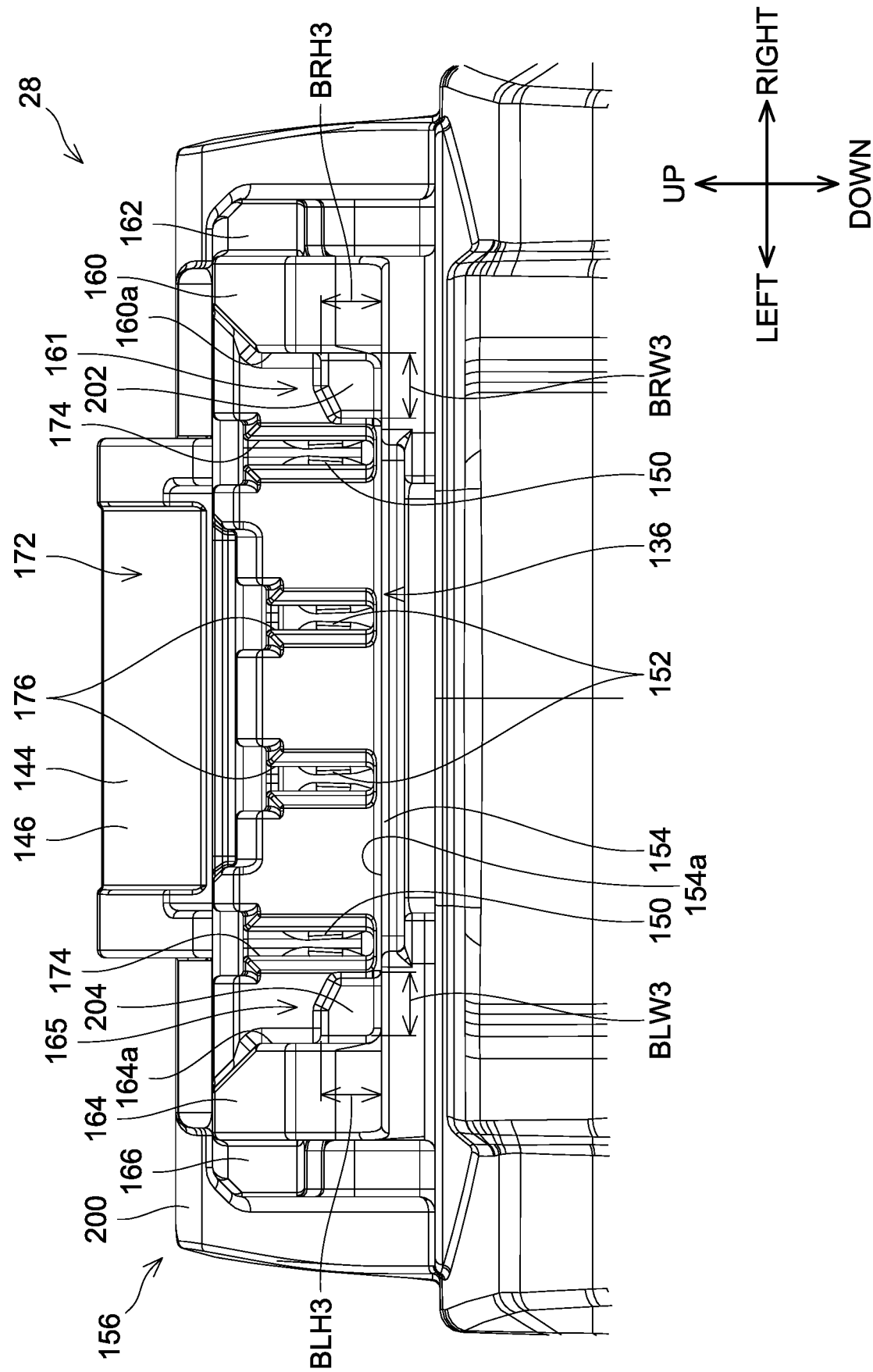
FIG. 21 is a rear view that shows the vicinity of an upper-side casing 200 of the battery pack 28 according to the exemplary embodiment.

As shown in FIG. 21, in the upper-side casing 200 of the battery pack 28, a (first) distinguishing rib (shoulder, protrusion, or differentiation/distinctive rib, shoulder or protrusion) 202 is formed at the upper-left portion of the location where the base part 154 connects to the right-side support wall 160, that is, in the battery-side distinguishing region 161. In addition, in the upper-side casing 200 of the battery pack 28, a (second) distinguishing rib (shoulder, protrusion, or differentiation/distinctive rib, shoulder or protrusion) 204 is formed at the upper-right portion of the location where the base part 154 connects to the left-side support wall 164, that is, in the battery-side distinguishing region 165. The distinguishing ribs 202, 204 each have a substantially polygonal-column shape, whose longitudinal direction is in the front-rear direction. The distinguishing ribs 202, 204 each have a substantially pentagonal, cross-sectional shape. The rear ends of the distinguishing ribs 202, 204 each are connected to the rear surface 170a of the rear plate 170 of the terminal-housing part 158.

The lower end (side, portion) of the distinguishing rib 202 is connected to the upper surface 154a of the base part 154. The right end (side, portion) of the distinguishing rib 202 is connected to the side surface 160a of the right-side support wall 160. The distinguishing rib 202 has a dimension BRW3 in the left-right direction and a dimension BRH3 in the up-down direction. The distinguishing rib 202 has a shape and dimensions such that it is capable of passing through (moving past) the notch 66 of the front wall 58 of the right-side reinforcing part 54 of the electrical device 12 and such that it is not capable of passing through (moving past) the notch 90 of the front wall 82 of the right-side reinforcing part 78 of the electrical device 14. The lower end of the distinguishing rib 204 is connected to the upper surface 154a of the base part 154. The left end of the distinguishing rib 204 is connected to the side surface 164a of the left-side support wall 164. The distinguishing rib 204 has a dimension BLW3 in the left-right direction and a dimension BLH3 in the up-down direction. The distinguishing rib 204 has a shape and dimensions such that it is capable of passing through (moving past): (i) the notch 70 of the front wall 62 of the left-side reinforcing part 56 of the electrical device 12 and (ii) the notch 112 of the front wall 108 of the left-side reinforcing part 102 of the electrical device 16 and such that it is not capable of passing through (moving past) the notch 94 of the front wall 86 of the left-side reinforcing part 80 of the electrical device 14.

When the battery pack 28 is slid rearward relative to the battery-pack mounting part 13 (refer to FIG. 5) of the electrical device 12, the distinguishing rib 202 passes through (moves past) the notch 66 and is housed (disposed) in the space 68, and the distinguishing rib 204 passes through (moves past) the notch 70 and is housed (disposed) in the space 72. Consequently, because the distinguishing rib 202 does not adversely interfere with (is not blocked by) the right-side reinforcing part 54 and the distinguishing rib 204 does not adversely interfere (is not blocked by) with the left-side reinforcing part 56, the battery pack 28 can be mounted on (and electrically connected to) the electrical device 12.

In contrast, when the battery pack 28 is slid rearward relative to the battery-pack mounting part 15 (refer to FIG. 7) of the electrical device 14, the distinguishing rib 202 interferes with (is blocked by) the right-side reinforcing part 78 and the distinguishing rib 204 interferes with (is blocked by) the left-side reinforcing part 80, and therefore the battery pack 28 cannot be slid rearward beyond the right-side and left-side reinforcing parts 78, 80. In addition, when the battery pack 28 is slid rearward relative to the battery-pack mounting part 17 (refer to FIG. 9) of the electrical device 16, the distinguishing rib 202 interferes with (is blocked by) the right-side reinforcing part 100, and therefore the battery pack 28 cannot be slid rearward beyond the right-side reinforcing part 100. Furthermore, when the battery pack 28 is slid rearward relative to the battery-pack mounting part 19 (refer to FIG. 11) of the electrical device 18, the distinguishing rib 202 interferes with (is blocked by) the right-side reinforcing part 118 and the distinguishing rib 204 interferes with (is blocked by) the left-side reinforcing part 120, and therefore the battery pack 28 cannot be slid rearward beyond the right-side and left-side reinforcing parts 118, 120. Consequently, the battery pack 28 cannot be (is prevented or blocked from being) mounted on (and thus cannot be electrically connected to) any of the electrical devices 14, 16, 18.

Figure 22:
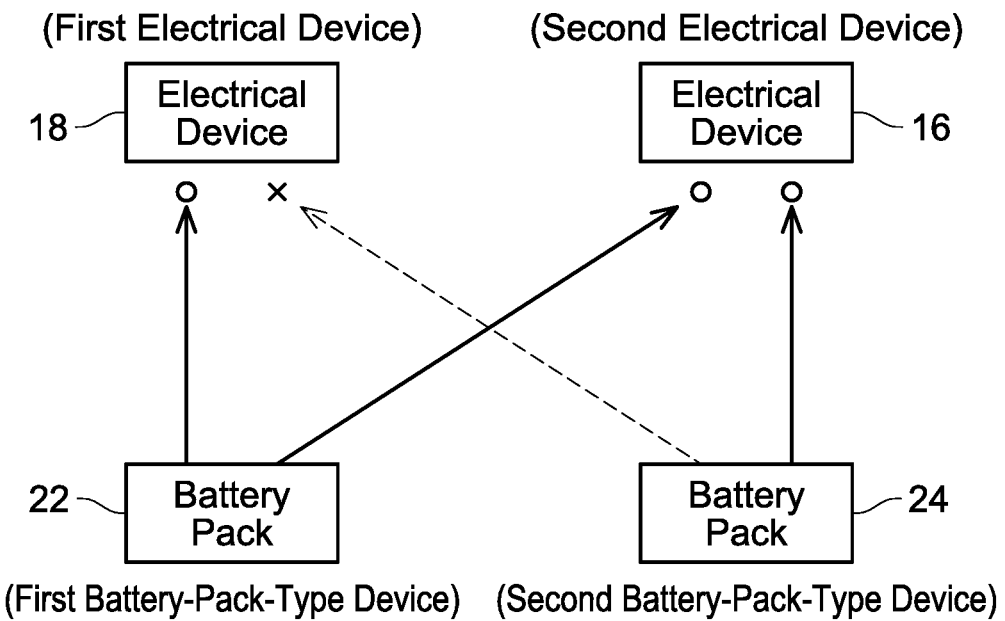
FIG. 22 shows combinations of the electrical devices 18, 16 and the battery packs 22, 24 according to the exemplary embodiment.

As described above, in one or more embodiments, the electrical-device system 2 comprises the electrical device 18 (example of the first electrical device), the electrical device 16 (example of the second electrical device), the battery pack 22 (example of the first battery-pack-type device or first detachable DC power source), and the battery pack 24 (example of the second battery-pack-type device or second detachable DC power source). The battery pack 22 and the battery pack 24 each comprise: the upper surface 154a (example of the reference surface) of the base part 154 extending in the front-rear direction and the left-right direction; the right-side support wall 160 and the left-side support wall 164 (example of the pair of support walls) protruding upward from the two (opposite) ends of the upper surface 154a and extending in the front-rear direction; the right-side rail 162 and the left-side rail 166 (example of the pair of battery-side rails) protruding outward in the left-right direction from the upper ends of the right-side support wall 160 and the left-side support wall 164 and extending in the front-rear direction; and the battery-side distinguishing region 165 (example of the first battery-side distinguishing region) disposed inward in the left-right direction of the right-side support wall 160 and the left-side support wall 164 and at the connection location between the left-side support wall 164 (example of the one support wall of the pair of support walls) and the upper surface 154a. The space 175 (example of the first battery-side space) is ensured (provided) in the battery-side distinguishing region 165 of the battery pack 22. The distinguishing rib 184 (example of the first battery-side distinguishing member), which is connected to the left-side support wall 164 and is connected to the upper surface 154a, is provided in the battery-side distinguishing region of the battery pack 24. The electrical device 18 and the electrical device 16 each comprise: the right-side rail 35 and the left-side rail 37 (example of the pair of device-side rails) that respectively engage, in a slidable manner in the front-rear direction, with the right-side rail 162 and the left-side rail 166; and the left-side reinforcing parts 120, 102 (examples of the first device-side distinguishing part), each of which is disposed at the location corresponding to the battery-side distinguishing region 165. The left-side reinforcing part 120 of the electrical device 18 has a shape that is incapable of receiving the first distinguishing rib 184; i.e. the first distinguishing rib 184 cannot be inserted past the forward edge of the left-side reinforcing part 120. On the other hand, the left-side reinforcing part 102 of the electrical device 16 has a shape that is capable of receiving the first distinguishing rib 184; i.e. the first distinguishing rib 184 can be inserted past the forward edge of the left-side reinforcing part 102. As shown in FIG. 1 and FIG. 22, the battery pack 22 is thus mountable on both the electrical device 18 and the electrical device 16, whereas the battery pack 24 is non-mountable (not mountable) on the electrical device 18 but is mountable on the electrical device 16.

In one or more embodiments, the weight of the battery pack 24 (e.g., 1.33 kg) is greater than the weight of the battery pack 22 (e.g., 1.01 kg).

In one or more embodiments, the battery pack 22 and the battery pack 24 each comprise the battery cells 130. The rated capacity of the battery pack 24 (e.g., 5.0 Ah) is higher than the rated capacity of the battery pack 22 (e.g., 4.0 Ah).

In one or more embodiments, the battery pack 22 and the battery pack 24 each comprise the battery cells 130. The rated voltage of the battery pack 24 (e.g., 36 V) is higher than the rated voltage of the battery pack 22 (e.g., 18 V).

In one or more embodiments, the electrical-device system 2 further comprises the electrical device 12 (example of the third electrical device) and the battery pack 26 (example of the third battery-pack-type device or third detachable DC power source). The battery pack 22 and the battery pack 24 each further comprise the battery-side distinguishing region 161 (example of the second battery-side distinguishing region) disposed inward in the left-right direction of the right-side support wall 160 and the left-side support wall 164 and at the connection location between the right-side support wall 160 (example of the other support wall of the pair of support walls) and the upper surface 154a. The space 171 (example of the second battery-side space) is ensured (provided) in each of the battery-side distinguishing region 161 of the battery pack 22 and the battery-side distinguishing region 161 of the battery pack 24. The battery pack 26 comprises: the upper surface 154a of the base part 154; the right-side support wall 160 and the left-side support wall 164; the right-side rail 162 and the left-side rail 166; the battery-side distinguishing region 165; and the battery-side distinguishing region 161. The distinguishing rib 194 (example of the first battery-side distinguishing member) is provided in the battery-side distinguishing region 165 of the battery pack 26. The distinguishing rib 192 (example of the second battery-side distinguishing member), which is connected to the right-side support wall 160 and is connected to the upper surface 154a, is provided in the battery-side distinguishing region 161 of the battery pack 26. The electrical device 18 and the electrical device 16 further respectively comprise the right-side reinforcing parts 118, 100 (examples of the second device-side distinguishing part), each of which is disposed at the location corresponding to the battery-side distinguishing region 161. The right-side reinforcing part 118 of the electrical device 18 and the right-side reinforcing part 100 of the electrical device 16 each have a shape that is incapable of receiving the distinguishing rib 192, i.e. the distinguishing rib 192 cannot be inserted past the forward edge of the right-side reinforcing part 118 of the electrical device 18 or past the forward edge of the right-side reinforcing part 100 of the electrical device 16. The electrical device 12 comprises: the right-side rail 35 and the left-side rail 37; the left-side reinforcing part 56 (example of the first device-side distinguishing part); and the right-side reinforcing part 54 (example of the second device-side distinguishing part). The left-side reinforcing part 56 of the electrical device 12 has a shape that is capable of receiving the distinguishing rib 184; i.e. the distinguishing rib 184 can be inserted past the forward edge of the left-side reinforcing part 56 of the electrical device 12. The right-side reinforcing part 54 of the electrical device 12 has a shape that is capable of receiving the distinguishing rib 192; i.e. the distinguishing rib 192 can be inserted past the forward edge of the right-side reinforcing part 54 of the electrical device 12. Therefore, the battery pack 22 is (configured to be) mountable on the electrical device 12 and the battery pack 24 also is (configured to be) mountable on the electrical device 12. On the other hand, the battery pack 26 is (configured to be) non-mountable (not mountable) on both the electrical device 18 and the electrical device 16, but is (configured to be) mountable on the electrical device 12.

In one or more embodiments, the weight of the battery pack 24 (e.g., 1.33 kg) is greater than the weight of the battery pack 22 (e.g., 1.01 kg). The weight of the battery pack 26 (e.g., 1.85 kg) is greater than the weight of the battery pack 24 (e.g., 1.33 kg).

In one or more embodiments, the battery pack 22, the battery pack 24, and the battery pack 26 each comprise the battery cells 130. The rated capacity of the battery pack 24 (e.g., 5.0 Ah) is higher than the rated capacity of the battery pack 22 (e.g., 4.0 Ah). The rated capacity of the battery pack 26 (e.g., 8.0 Ah) is higher than the rated capacity of the battery pack 24 (e.g., 5.0 Ah).

In one or more embodiments, the battery pack 22, the battery pack 24, and the battery pack 26 each comprise the battery cells 130. The rated voltage of the battery pack 24 (e.g., 36 V) is higher than the rated voltage of the battery pack 22 (e.g., 18 V). The rated voltage of the battery pack 26 (e.g., 72 V) is higher than the rated voltage of the battery pack 24 (e.g., 36 V).

Figure 23:
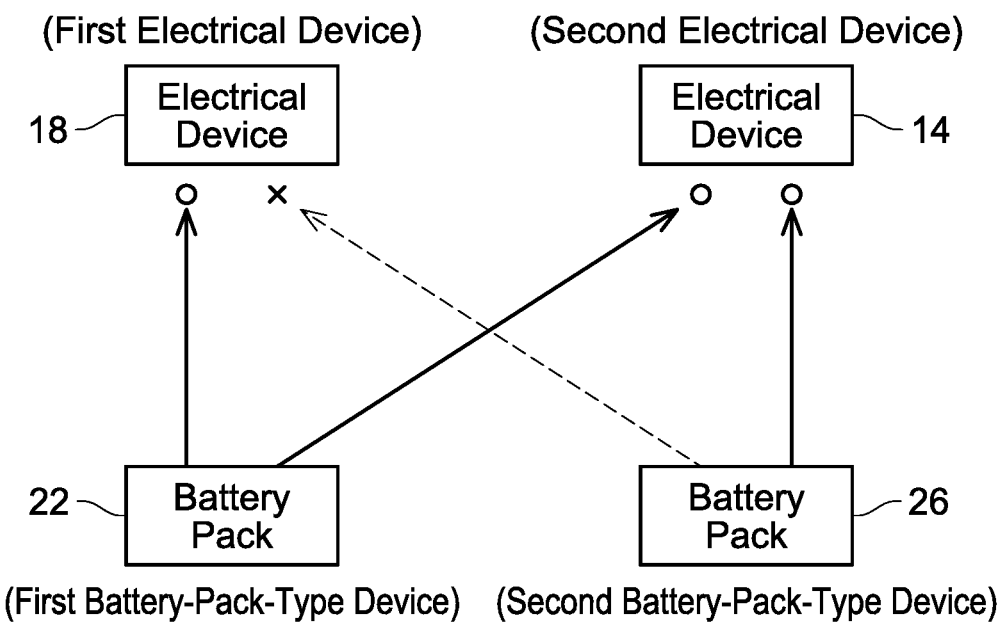
FIG. 23 shows combinations of the electrical devices 18, 14 and the battery packs 22, 26 according to the exemplary embodiment.

Alternatively, in one or more embodiments, the electrical-device system 2 comprises the electrical device 18 (example of the first electrical device), the electrical device 14 (example of the second electrical device), the battery pack 22 (example of the first battery-pack-type device or first detachable DC power source), and the battery pack 26 (example of the second battery-pack-type device or second detachable DC power source). The battery pack 22 and the battery pack 26 each comprise: an upper surface 154*a* (example of the reference surface) of the base part 154 extending in the front-rear direction and the left-right direction; the right-side support wall 160 and the left-side support wall 164 (example of the pair of support walls) protruding upward from both ends of the upper surface 154*a* and extending in the front-rear direction; the right-side rail 162 and the left-side rail 166 (example of the pair of battery-side rails) protruding outward in the left-right direction from the upper ends of the right-side support wall 160 and the left-side support wall 164 and extending in the front-rear direction; and the battery-side distinguishing region 165 (example of the first battery-side distinguishing region) disposed inward of the right-side support wall 160 and the left-side support wall 164 in the left-right direction and at the connection location between the left-side support wall 164 (example of the one support wall of the pair of support walls) and the upper surface 154*a*. The space 175 (example of the first battery-side space) is ensured (provided) in the battery-side distinguishing region 165 of the battery pack 22. The distinguishing rib 194 (example of the first battery-side distinguishing member), which is connected to the left-side support wall 164 (example of the one support wall of the pair of support walls) and is connected to the upper surface 154*a*, is provided in the battery-side distinguishing region 165 of the battery pack 26. The electrical device 18 and the electrical device 14 each comprise the right-side rail 35 and the left-side rail 37 (example of the pair of device-side rails), which respectively engage with the right-side rail 162 and the left-side rail 166 in a slidable manner in the front-rear direction, and respectively comprise the left-side reinforcing parts 120, 80 (example of the first device-side distinguishing part), each of which is disposed at a location corresponding to the battery-side distinguishing region 165. The left-side reinforcing part 120 of the electrical device 18 has a shape that is incapable of receiving the distinguishing rib 194, i.e. the distinguishing rib 194 cannot be inserted past the forward edge of the left-side reinforcing part 120 of the electrical device 18. The left-side reinforcing part 80 of the electrical device 14 has a shape that is capable of receiving the distinguishing rib 194; i.e. the distinguishing rib 194 can be inserted past the forward edge of the left-side reinforcing part 80 of the electrical device 14. As shown in FIG. 1 and FIG. 23, the battery pack 22 is (configured to be) mountable on both the electrical device 18 and the electrical device 14. On the other hand, the battery pack 26 is (configured to be) non-mountable on the electrical device 18 while being (configured to be) mountable on the electrical device 14.

In one or more embodiments, the weight of the battery pack 26 (e.g., 1.85 kg) is greater than the weight of the battery pack 22 (e.g., 1.01 kg).

In one or more embodiments, the battery pack 22 and the battery pack 26 each comprise the battery cells 130. The number of the battery cells 130 (e.g., 20) of the battery pack 26 is greater than the number of the battery cells 130 (e.g., 10) of the battery pack 22.

In one or more embodiments, the battery pack 22 and the battery pack 26 each comprise the battery cells 130. The rated capacity of the battery pack 26 (e.g., 8.0 Ah) is higher than the rated capacity of the battery pack 22 (e.g., 4.0 Ah).

In one or more embodiments, the battery pack 22 and the battery pack 26 each comprise the battery cells 130. The rated voltage of the battery pack 26 (e.g., 72 V) is higher than the rated voltage of the battery pack 22 (e.g., 18 V).

In one or more embodiments, the electrical-device system 2 further comprises the electrical device 12 (example of the third electrical device) and the battery pack 28 (example of the third battery-pack-type device or third detachable DC power source). The battery pack 28 comprises: the upper surface 154*a* of the base part 154; the right-side support wall 160 and the left-side support wall 164; the right-side rail 162 and the left-side rail 166; and the battery-side distinguishing region 165. The distinguishing rib 204 (example of the third battery-side distinguishing member), which is connected to the left-side support wall 164 (example of the one support wall of the pair of support walls) and is connected to the upper surface 154a and whose size is larger than that of the distinguishing rib 194, is provided in the battery-side distinguishing region 165 of the battery pack 28. The left-side reinforcing part 120 of the electrical device 18 and the left-side reinforcing part 80 of the electrical device 14 each have the shape that is incapable of receiving the distinguishing rib 204; i.e. the distinguishing rib 204 cannot be inserted past the forward edge of the left-side reinforcing part 120 of the electrical device 18 or past the forward edge of the left-side reinforcing part 80 of the electrical device 14. The electrical device 12 comprises: the right-side rail 35 and the left-side rail 37; and the left-side reinforcing part 56 (example of the first device-side distinguishing part). The left-side reinforcing part 56 of the electrical device 12 has a shape that is capable of receiving the distinguishing rib 194 and the distinguishing rib 204; i.e. the distinguishing rib 194 and the distinguishing rib 204 can be inserted past the forward edge of the left-side reinforcing part 56 of the electrical device 12. Thus, the battery pack 22 is (configured to be) mountable on the electrical device 12 and the battery pack 26 also is (configured to be) mountable on the electrical device 12. On the other hand, the battery pack 28 is (configured to be) non-mountable (not mountable) on both the electrical device 18 and the electrical device 14, while being (configured to be) mountable on the electrical device 12.

In one or more embodiments, the battery pack 22, the battery pack 26, and the battery pack 28 each further comprise the battery-side distinguishing region 161 (example of the second battery-side distinguishing region) disposed inward of the right-side support wall 160 and the left-side support wall 164 in the left-right direction and at the connection location between the right-side support wall 160 (example of the other support wall of the pair of support walls) and the upper surface 154a. The space 171 (example of the second battery-side space) is ensured (provided) in the battery-side distinguishing region 161 of the battery pack 22. The distinguishing rib 192 (example of the second battery-side distinguishing member), which is connected to the right-side support wall 160 and is connected to the upper surface 154a, is provided in the battery-side distinguishing region 161 of the battery pack 26. The distinguishing rib 202 (example of the fourth battery-side distinguishing member), which is connected to the right-side support wall 160 and is connected to the upper surface 154a and whose size is larger than that of the distinguishing rib 192, is provided in the battery-side distinguishing region 161 of the battery pack 28. The electrical device 18, the electrical device 14, and the electrical device 12 further respectively comprise the right-side reinforcing parts 118, 78, 54 (examples of the second device-side distinguishing part), each of which is disposed at the location corresponding to the battery-side distinguishing region 161. The right-side reinforcing part 118 of the electrical device 18 has a shape that is incapable of receiving the distinguishing rib 192 and the distinguishing rib 202; i.e. the distinguishing rib 192 and the distinguishing rib 202 cannot be inserted past the forward edge of the right-side reinforcing part 118 of the electrical device 18. The right-side reinforcing part 78 of the electrical device 14 has a shape that is capable of receiving the distinguishing rib 192 and is incapable of receiving the distinguishing rib 202; i.e. the distinguishing rib 192 can be inserted past the forward edge of the right-side reinforcing part 78 of the electrical device 14 but cannot be inserted past the forward edge of the right-side reinforcing part 78 of the electrical device 14. The right-side reinforcing part 54 of the electrical device 12 has a shape that is capable of receiving the distinguishing rib 192 and the distinguishing rib 202; i.e. both the distinguishing rib 192 and the distinguishing rib 202 can be inserted past the forward edge of the right-side reinforcing part 54 of the electrical device 12.

In one or more embodiments, the weight of the battery pack 26 (e.g., 1.85 kg) is greater than the weight of the battery pack 22 (e.g., 1.01 kg). The weight of the battery pack 28 (e.g., 2.7 kg) is greater than the weight of the battery pack 26 (e.g., 1.85 kg).

In one or more embodiments, the battery pack 22, the battery pack 26, and the battery pack 28 each comprise the battery cells 130. The number (e.g., 20) of the battery cells 130 of the battery pack 26 is greater than the number (e.g., 10) of the battery cells 130 of the battery pack 22. The number (e.g., 30) of the battery cells 130 of the battery pack 28 is greater than the number (e.g., 20) of the battery cells 130 of the battery pack 26.

In one or more embodiments, the battery pack 22, the battery pack 26, and the battery pack 28 each comprise the battery cells 130. The rated capacity (e.g., 8.0 Ah) of the battery pack 26 is higher than the rated capacity (e.g., 4.0 Ah) of the battery pack 22. The rated capacity (e.g., 12.0 Ah) of the battery pack 28 is higher than the rated capacity (e.g., 8.0 Ah) of the battery pack 26.

In one or more embodiments, the battery pack 22, the battery pack 26, and the battery pack 28 each comprise the battery cells 130. The rated voltage (e.g., 72 V) of the battery pack 26 is higher than the rated voltage (e.g., 18 V) of the battery pack 22. The rated voltage (e.g., 108 V) of the battery pack 28 is higher than the rated voltage (e.g., 72 V) of the battery pack 26.

Figure 24:
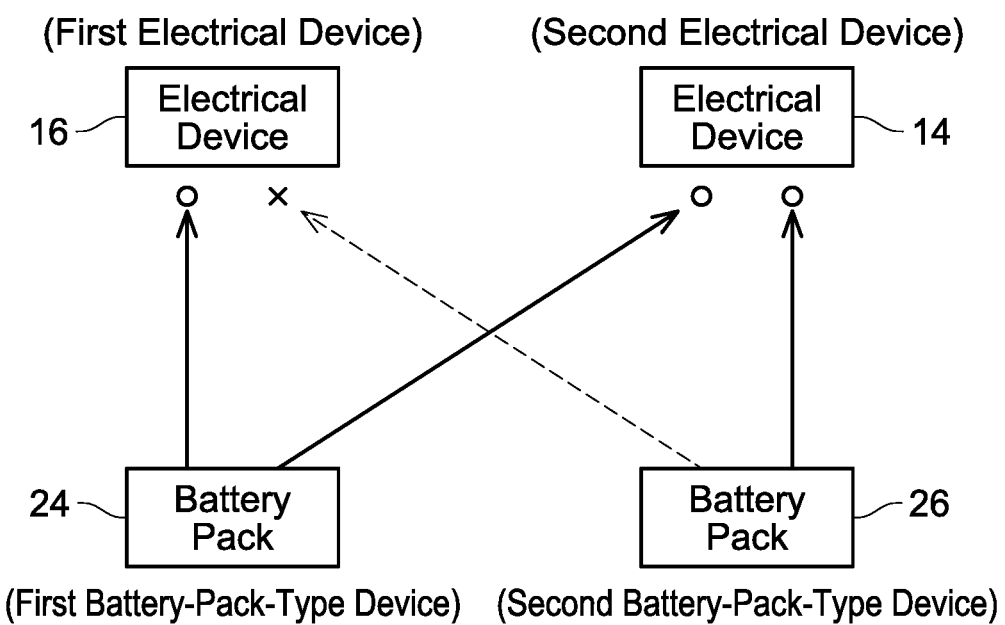
FIG. 24 shows combinations of the electrical devices 16, 14 and the battery packs 24, 26 according to the exemplary embodiment.

Alternatively, in one or more embodiments, the electrical-device system 2 comprises the electrical device 16 (example of the first electrical device), the electrical device 14 (example of the second electrical device), the battery pack 24 (example of the first battery-pack-type device or first detachable DC power source), and the battery pack 26 (example of the second battery-pack-type device or second detachable DC power source). The battery pack 24 and the battery pack 26 each comprise: the upper surface 154a (example of the reference surface) of the base part 154 extending in the front-rear direction and the left-right direction; the right-side support wall 160 and the left-side support wall 164 (example of the pair of support walls) protruding upward from both ends of the upper surface 154a and extending in the front-rear direction; the right-side rail 162 and the left-side rail 166 (example of the pair of battery-side rails) protruding outward in the left-right direction from the upper ends of the right-side support wall 160 and the left-side support wall 164 and extending in the front-rear direction; and the battery-side distinguishing region 161 (example of the first battery-side distinguishing region) disposed inward of the right-side support wall 160 and the left-side support wall 164 in the left-right direction and at the connection location between the right-side support wall 160 (example of the one support wall of the pair of support walls) and the upper surface 154a. The space 171 (example of the first battery-side space) is ensured (provided) in the battery-side distinguishing region 161 of the battery pack 24. The distinguishing rib 192 (example of the first battery-side distinguishing member), which is connected to the right-side support wall 160 and is connected to the upper surface 154a, is provided in the battery-side distinguishing region 161 of the battery pack 26. The electrical device 16 and the electrical device 14 each comprise the right-side rail 35 and the left-side rail 37 (example of the pair of device-side rails), which respectively engage with the right-side rail 162 and the left-side rail 166 in a slidable manner in the front-rear direction, and respectively comprise the right-side reinforcing parts 100, 78 (example of the first device-side distinguishing part), each of which is disposed at a location corresponding to the battery-side distinguishing region 161. The right-side reinforcing part 100 of the electrical device 16 has a shape that is incapable of receiving the distinguishing rib 192; i.e. the distinguishing rib 192 cannot be inserted past the forward edge of the right-side reinforcing part 100 of the electrical device 16. The right-side reinforcing part 78 of the electrical device 14 has a shape that is capable of receiving the distinguishing rib 192; i.e. the distinguishing rib 192 can be inserted past the forward edge of the right-side reinforcing part 78 of the electrical device 14. Therefore, as shown in FIG. 1 and FIG. 24, the battery pack 24 is (configured to be) mountable on the electrical device 16 and on the electrical device 14. On the other hand, the battery pack 26 is (configured to be) non-mountable (not mountable) on the electrical device 16, while being (configured to be) mountable on the electrical device 14.

In one or more embodiments, the weight of the battery pack 26 (e.g., 1.85 kg) is greater than the weight of the battery pack 24 (e.g., 1.33 kg).

In one or more embodiments, the battery pack 24 and the battery pack 26 each comprise the battery cells 130. The size of the battery cells 130 (e.g., diameter of 21 mm and height of 70 mm) of the battery pack 26 is larger than the size of the battery cells 130 (e.g., diameter of 18 mm and height of 65 mm) of the battery pack 24.

In one or more embodiments, the battery pack 24 and the battery pack 26 each comprise the battery cells 130. The rated capacity of the battery pack 26 (e.g., 8.0 Ah) is higher than the rated capacity of the battery pack 24 (e.g., 5.0 Ah).

In one or more embodiments, the battery pack 24 and the battery pack 26 each comprise the battery cells 130. The rated voltage of the battery pack 26 (e.g., 72 V) is higher than the rated voltage of the battery pack 24 (e.g., 36 V).

In one or more embodiments, the electrical-device system 2 further comprises the electrical device 12 (example of the third electrical device) and the battery pack 28 (example of the third battery-pack-type device or third detachable DC power source). The battery pack 28 comprises: the upper surface 154a of the base part 154; the right-side support wall 160 and the left-side support wall 164; the right-side rail 162 and the left-side rail 166; and the battery-side distinguishing region 161. The distinguishing rib 202 (example of the third battery-side distinguishing member), which is connected to the right-side support wall 160 (example of the one support wall of the pair of support walls) and is connected to the upper surface 154a and whose size is larger than that of the distinguishing rib 192, is provided in the battery-side distinguishing region 161 of the battery pack 28. The right-side reinforcing part 100 of the electrical device 16 and the right-side reinforcing part 78 of the electrical device 14 each have a shape that is incapable of receiving the distinguishing rib 202; i.e. the distinguishing rib 202 cannot be inserted past the forward edge of the right-side reinforcing part 100 of the electrical device 16 and the right-side reinforcing part 78 of the electrical device 14. The electrical device 12 comprises: the right-side rail 35 and the left-side rail 37; and the right-side reinforcing part 54 (example of the first device-side distinguishing part). The right-side reinforcing part 54 of the electrical device 12 has a shape that is capable of receiving the distinguishing rib 192 and the distinguishing rib 202; i.e. both the distinguishing rib 192 and the distinguishing rib 202 can be inserted past the forward edge of the right-side reinforcing part 54 of the electrical device 12. Thus, the battery pack 24 is (configured to be) mountable on the electrical device 12 and the battery pack 26 also is (configured to be) mountable on the electrical device 12. On the other hand, the battery pack 28 is (configured to be) non-mountable (not mountable) on both the electrical device 16 and the electrical device 14, while being (configured to be) mountable on the electrical device 12.

In one or more embodiments, the weight of the battery pack 26 (e.g., 1.85 kg) is greater than the weight of the battery pack 24 (e.g., 1.33 kg). The weight of the battery pack 28 (e.g., 2.7 kg) is greater than the weight of the battery pack 26 (e.g., 1.85 kg).

In one or more embodiments, the battery pack 24, the battery pack 26, and the battery pack 28 each comprise the battery cells 130. The rated voltage of the battery pack 26 (e.g., 72 V) is higher than the rated voltage of the battery pack 24 (e.g., 36 V). The rated voltage of the battery pack 28 (e.g., 108 V) is higher than the rated voltage of the battery pack 26 (e.g., 72 V).

In one or more embodiments, the battery packs 24, 26, 28 (examples of the battery-pack-type device) each comprise: the upper surface 154a (example of the reference surface) of the base part 154 extending in a front-rear direction and a left-right direction; the right-side support wall 160 and the left-side support wall 164 (example of the pair of support walls) protruding upward from both ends of the upper surface 154a and extending in the front-rear direction; the right-side rail 162 and the left-side rail 166 (example of the pair of battery-side rails) protruding outward in the left-right direction from the upper ends of the right-side support wall 160 and the left-side support wall 164 and extending in the front-rear direction; and the battery-side distinguishing region 165 (example of the first battery-side distinguishing region) disposed inward of the right-side support wall 160 and the left-side support wall 164 in the left-right direction and at a connection location between the left-side support wall 164 (example of the one support wall of the pair of support walls) and the upper surface 154a. The distinguishing ribs 184, 194, 204 (examples of the first battery-side distinguishing member), each of which is connected to the left-side support wall 164 and is connected to the upper surface 154a, are each provided in the battery-side distinguishing region 165.

In one or more embodiments, the weight of each of the battery packs 24, 26, 28 is 1.1 kg or more.

In one or more embodiments, the battery packs 26, 28 each further comprise: the battery-side distinguishing region 161 (example of the second battery-side distinguishing region) disposed inward of the right-side support wall 160 and the left-side support wall 164 in the left-right direction and at the connection location between the right-side support wall 160 (example of the other support wall of the pair of support walls) and the upper surface 154a. The distinguishing ribs 192, 202 (examples of the second battery-side distinguishing member), each of which is connected to the right-side support wall 160 and is connected to the upper surface 154a, are each provided in the battery-side distinguishing region 161.

In one or more embodiments, the weight of each of the battery packs 26, 28 is 1.5 kg or more.

(Modified Examples)

In the above-mentioned exemplary embodiment, although an example was explained for an embodiment in which the first device-side distinguishing part and the second device-side distinguishing part of the electrical devices 12, 14, 16, 18 are the right-side reinforcing parts 54, 78, 100, 118 and the left-side reinforcing parts 56, 80, 102, 120 of the wiring part 44, respectively, the first device-side distinguishing part and the second device-side distinguishing part may be other members (structures) of the battery-pack mounting parts 13, 15, 17, 19.

In the above-mentioned exemplary embodiment, although an example was explained for an embodiment in which the first battery-side distinguishing member and the second battery-side distinguishing member of the battery packs 24, 26, 28 are the distinguishing ribs 184, 192, 194, 202, 204, each having a substantially polygonal-column shape, the first battery-side distinguishing member and the second battery-side distinguishing member may be members (structures) having some other shape. In addition, the distinguishing ribs 184, 192, 194, 202, 204 should connect the upper surface 154a of the base part 154, the side surface 160a of the right-side support wall 160, and the side surface 164a of the left-side support wall 164, but do not have to be connected to the rear surface 170a of the rear plate 170.

In the above-mentioned exemplary embodiment, an example was explained for an embodiment in which the dimensions BRW3, BLW3 of the distinguishing ribs 202, 204 of the battery pack 28 in the left-right direction are greater than the dimensions BLW1, BRW2, BLW2 of the distinguishing ribs 184, 192, 194 of the battery packs 24, 26 in the left-right direction, and the dimensions BRH3, BLH3 of the distinguishing ribs 202, 204 of the battery pack 28 in the up-down direction are approximately the same as the dimensions BLH1, BRH2, BLH2 of the distinguishing ribs 184, 192, 194 of the battery packs 24, 26 in the up-down direction. In contrast, it may be configured such that the dimensions BRW3, BLW3 of the distinguishing ribs 202, 204 of the battery pack 28 in the left-right direction are approximately the same as the dimensions BLW1, BRW2, BLW2 of the distinguishing ribs 184, 192, 194 of the battery packs 24, 26 in the left-right direction, and the dimensions BRH3, BLH3 of the distinguishing ribs 202, 204 of the battery pack 28 in the up-down direction are greater than the dimensions BLH1, BRH2, BLH2 of the distinguishing ribs 184, 192, 194 of the battery packs 24, 26 in the up-down direction. Alternatively, it may be configured such that the dimensions BRW3, BLW3 of the distinguishing ribs 202, 204 of the battery pack 28 in the left-right direction are greater than the dimensions BLW1, BRW2, BLW2 of the distinguishing ribs 184, 192, 194 of the battery packs 24, 26 in the left-right direction, and the dimensions BRH3, BLH3 of the distinguishing ribs 202, 204 of the battery pack 28 in the up-down direction are greater than the dimensions BLH1, BRH2, BLH2 of the distinguishing ribs 184, 192, 194 of the battery packs 24, 26 in the up-down direction. In any of these situations, the right-side reinforcing part 54 and the left-side reinforcing parts 56, 102 of the electrical devices 12, 16 should be given a shape, by modifying the dimensions MRW1, MLW1, MLW3 of the notches 66, 70, 112 in the left-right direction and the dimensions MRH1, MLH1, MLH3 of the notches 66, 70, 112 in the up-down direction, that is capable of receiving the distinguishing ribs 202, 204 of the battery pack 28.

In the above-mentioned exemplary embodiment, although an example was explained for an embodiment in which each of the first battery-pack-type device, the second battery-pack-type device, and the third battery-pack-type device are any of the battery packs 22, 24, 26, 28, the first battery-pack-type device, the second battery-pack-type device, and the third battery-pack-type device may be, instead of the battery packs 22, 24, 26, 28, a device that is mountable on the electrical devices 12, 14, 16, 18, e.g., an adapter or the like that is connectable to an electric power source, such as e.g., a conventional battery pack that does not have distinguishing ribs.

EXPLANATION OF THE REFERENCE NUMBERS

2 Electrical-device system
12 Electrical device
13 Battery-pack mounting part
14 Electrical device
15 Battery-pack mounting part
16 Electrical device
17 Battery-pack mounting part
18 Electrical device
19 Battery-pack mounting part
22 Battery pack
24 Battery pack
26 Battery pack
28 Battery pack
33 Housing
34 Device-side terminal
35 Right-side rail
36 Terminal block
37 Left-side rail
38 Device-side rail
39 Engaging groove
40 Electric-power terminal
42 Signal terminal
44 Wiring part
46 Through hole
48 Signal wiring
50 Signal-terminal board
52 Front plate
54 Right-side reinforcing part
56 Left-side reinforcing part
58 Front wall
60 Right wall
62 Front wall
64 Left wall
66 Notch
68 Space
70 Notch
72 Space
76 Terminal block
78 Right-side reinforcing part
80 Left-side reinforcing part
82 Front wall
84 Right wall
86 Front wall
88 Left wall
90 Notch
92 Space
94 Notch
96 Space
98 Terminal block
100 Right-side reinforcing part
102 Left-side reinforcing part
104 Front wall
106 Right wall
108 Front wall
110 Left wall
112 Notch
114 Space
116 Terminal block
118 Right-side reinforcing part
120 Left-side reinforcing part 122 Front wall
124 Right wall
126 Front wall
128 Left wall
130 Battery cell
132 Cell holder
134 Control board
136 Battery-side terminal
138 Casing
140 Lower-side casing
142 Upper-side casing
144 Hook
145 Compression spring
146 Engaging part
148 Manipulatable part
150 Electric-power terminal
152 Signal terminal
154 Base part
154a Upper surface
156 Battery-side rail
158 Terminal-housing part
160 Right-side support wall
160a Side surface
161 Battery-side distinguishing region
162 Right-side rail
164 Left-side support wall
164a Side surface
165 Battery-side distinguishing region
166 Left-side rail
168 Upper plate
170 Rear plate
170a Rear surface
171 Space
172 Terminal opening
173 Space
174 Electric-power terminal opening
175 Space
176 Signal-terminal opening
178 Casing
180 Lower-side casing
182 Upper-side casing
184 Distinguishing rib
186 Casing
188 Lower-side casing
190 Upper-side casing
192 Distinguishing rib
194 Distinguishing rib
196 Casing
198 Lower-side casing
200 Upper-side casing
202 Distinguishing rib
204 Distinguishing rib

What is claimed is:

1. An electrical-device system comprising:
a first electrical device;
a second electrical device;
a first detachable DC power source; and
a second detachable DC power source;
wherein:
the first detachable DC power source and the second detachable DC power source each comprise:
a reference surface extending in a front-rear direction and in a left-right direction that is perpendicular to the front-rear direction;
first and second support walls protruding upward from opposite ends of the reference surface in the left-right direction and extending in the front-rear direction;
first and second battery rails respectively protruding outward in the left-right direction from upper ends of the first and second support walls and extending in the front-rear direction; and
a first battery distinguishing region disposed between the first and second support walls in the left-right direction and at a first connection location of the reference surface with a first one of the first and second support walls;
a first battery space is provided in the first battery distinguishing region of the first detachable DC power source;
a first battery distinguishing member is disposed in the first battery distinguishing region of the second detachable DC power source, the first battery distinguishing member being directly connected to both the reference surface and the first one of the first and second support walls to reinforce the first connection location;
the first electrical device and the second electrical device each comprise:
first and second device rails that respectively engage, in a slidable manner in the front-rear direction, with the first and second battery rails; and
a first device distinguishing part disposed at a location corresponding to the first battery distinguishing region;
the first device distinguishing part of the first electrical device has a shape that is incapable of receiving the first battery distinguishing member;
the first device distinguishing part of the second electrical device has a shape that is capable of receiving the first battery distinguishing member;
the first detachable DC power source is mountable on both the first electrical device and the second electrical device; and
the second detachable DC power source is mountable on the second electrical device but is not mountable on the first electrical device.

2. The electrical-device system according to claim 1, wherein the second detachable DC power source has a greater weight than the first detachable DC power source.

3. The electrical-device system according to claim 1, wherein the second detachable DC power source has a greater number of battery cells than the first detachable DC power source.

4. The electrical-device system according to claim 1, wherein the second detachable DC power source has larger sized battery cells than the first detachable DC power source.

5. The electrical-device system according to claim 1, wherein the second detachable DC power source has a higher rated battery capacity than the first detachable DC power source.

6. The electrical-device system according to claim 1, wherein the second detachable DC power source has a higher rated battery voltage than the first detachable DC power source.

7. The electrical-device system according to claim 1, wherein the first battery distinguishing member is a rib, shoulder or protrusion that extends in the front-rear direction and is integrally formed with, and directly intersects, the reference surface and the first one of the first and second support walls.

8. The electrical-device system according to claim 1, further comprising:
a third electrical device; and
a third detachable DC power source;
wherein:
the first detachable DC power source and the second detachable DC power source each further comprise a second battery distinguishing region disposed between the first and second support walls in the left-right direction and at a second connection location of the reference surface with a second one of the first and second support walls;
a second battery space is provided in each of the second battery distinguishing region of the first detachable DC power source and the second battery distinguishing region of the second detachable DC power source;
the third detachable DC power source comprises:
the reference surface;
the first and second support walls;
the first and second battery rails;
the first battery distinguishing region; and
the second battery distinguishing region;
the first battery distinguishing member is provided in the first battery distinguishing region of the third detachable DC power source;
a second battery distinguishing member is provided in the second battery distinguishing region of the third detachable DC power source, the second battery distinguishing member being connected to both the reference surface and the second one of the first and second support walls;
the first electrical device and the second electrical device each further comprise a second device distinguishing part disposed at a location corresponding to the second battery distinguishing region;
the second device distinguishing part of the first electrical device and the second device distinguishing part of the second electrical device each have a shape that is incapable of receiving the second battery distinguishing member;
the third electrical device comprises:
the first and second device rails;
the first device distinguishing part; and
the second device distinguishing part;
the first device distinguishing part of the third electrical device has a shape that is capable of receiving the first battery distinguishing member;
the second device distinguishing part of the third electrical device has a shape that is capable of receiving the second battery distinguishing member;
the first detachable DC power source is mountable on the third electrical device;
the second detachable DC power source is mountable on the third electrical device; and
the third detachable DC power source is mountable on the third electrical device, but is not mountable on the first electrical device or on the second electrical device.

9. The electrical-device system according to claim 1, further comprising:
a third electrical device; and
a third detachable DC power source;
wherein:
the third detachable DC power source comprises:
the reference surface;
the first and second support walls;
the first and second battery rails;
the first battery distinguishing region; and
a third battery distinguishing member provided in the first battery distinguishing region of the third detachable DC power source, the third battery distinguishing member being connected to the reference surface and the first one of the first and second support walls, and having a larger size than the first battery distinguishing member;
the first device distinguishing part of the first electrical device and the first device distinguishing part of the second electrical device each have a shape that is incapable of receiving the third battery distinguishing member;
the third electrical device comprises:
the first and second device rails; and
the first device distinguishing part;
the first device distinguishing part of the third electrical device has a shape that is capable of receiving both the first battery distinguishing member and the third battery distinguishing member;
the first detachable DC power source is mountable on the third electrical device;
the second detachable DC power source is mountable on the third electrical device; and
the third detachable DC power source is mountable on the third electrical device, but is not mountable on the first electrical device or on the second electrical device.

10. The electrical-device system according to claim 9, wherein:
the first, second and third detachable DC power sources each further comprise a second battery distinguishing region disposed between the first and second support walls in the left-right direction and at a second connection location of the reference surface with a second one of the first and second support walls;
a second battery space is provided in the second battery distinguishing region of the first detachable DC power source;
a second battery distinguishing member is provided in the second battery distinguishing region of the second detachable DC power source, the second battery distinguishing member being connected to both the reference surface and the second one of the first and second support walls;
a fourth battery distinguishing member provided in the second battery distinguishing region of the third detachable DC power source, the fourth battery distinguishing member being connected to both the reference surface and the second one of the first and second support walls, and having a larger size than the second battery distinguishing member;
the first, second and third electrical devices each further comprise a second device distinguishing part disposed at a location corresponding to the second battery distinguishing region;
the second device distinguishing part of the first electrical device has a shape that is incapable of receiving the second battery distinguishing member and the fourth battery distinguishing member;
the second device distinguishing part of the second electrical device has a shape that is capable of receiving the second battery distinguishing member and is incapable of receiving the fourth battery distinguishing member; and
the second device distinguishing part of the third electrical device has a shape that is capable of receiving the second battery distinguishing member and the fourth battery distinguishing member.

11. The electrical-device system according to claim 8, wherein:
the second detachable DC power source has a greater weight than the first detachable DC power source; and
the third detachable DC power source has a greater weight than the second detachable DC power source.

12. The electrical-device system according to claim 8, wherein:
the second detachable DC power source has a greater number of battery cells than the first detachable DC power source; and
the third detachable DC power source has a greater number of battery cells than the second detachable DC power source.

13. The electrical-device system according to claim 8, wherein:
the second detachable DC power source has a higher rated capacity than the first detachable DC power source; and
the third detachable DC power source has a higher rated capacity than the second detachable DC power source.

14. The electrical-device system according to claim 8, wherein:
the second detachable DC power source has a higher rated voltage than the first detachable DC power source; and
the third detachable DC power source has a higher rated voltage than the second detachable DC power source.

15. A detachable DC power source, comprising:
a reference surface extending in a front-rear direction and a left-right direction that is perpendicular to the front-rear direction;
first and second support walls protruding upward from opposite ends of the reference surface in the left-right direction and extending in the front-rear direction;
first and second battery rails respectively protruding outward in the left-right direction from upper ends of the first and second support walls and extending in the front-rear direction;
a first battery distinguishing region disposed between the first and second support walls in the left-right direction and at a first connection location of the reference surface with a first one of the first and second support walls; and
a first battery distinguishing member provided in the first battery distinguishing region, the first battery distinguishing member being directly connected to both the reference surface and the first one of the first and second support walls;
wherein:
the first battery distinguishing member is disposed entirely within a space between facing surfaces of the first and second support walls;
the first battery distinguishing member is disposed entirely between the reference surface and an upper surface of a first one of the first and second battery rail in an up-down direction that is perpendicular to both the left-right direction and the front-rear direction.

16. The detachable DC power source according to claim 15, wherein the detachable DC power source has a weight of 1.1 kg or more.

17. The detachable DC power source according to claim 15, further comprising:
a second battery distinguishing region disposed between the first and second support walls in the left-right direction and at a second connection location of the reference surface with a second one of the first and second support walls; and
a second battery distinguishing member provided in the second battery distinguishing region, the second battery distinguishing member being directly connected to both the reference surface and the second one of the first and second support walls.

18. The detachable DC power source according to claim 17, wherein:
the first battery distinguishing member is a rib, shoulder or protrusion that extends in the front-rear direction and is integrally formed with, and directly intersects, the reference surface and the first one of the first and second support walls; and
the second battery distinguishing member is a rib, shoulder or protrusion that extends in the front-rear direction and is integrally formed with, and directly intersects, the reference surface and the second one of the first and second support walls.

19. The detachable DC power source according to claim 15, wherein:
the first one of the first and second battery rails protrudes from the first one of the first and second support walls.

20. The electrical-device system according to claim 1, wherein:
the first battery distinguishing member is disposed entirely within a space between facing surfaces of the first and second support walls;
the first battery distinguishing member is disposed entirely between the reference surface and an upper surface of a first one of the first and second battery rail in an up-down direction that is perpendicular to both the left-right direction and the front-rear direction; and
the first one of the first and second battery rails protrudes from the first one of the first and second support walls.

* * * * *